(12) United States Patent
    Kurihara

(10) Patent No.: US 8,339,654 B2
(45) Date of Patent: Dec. 25, 2012

(54) DOCUMENT PROCESSING SYSTEM, DOCUMENT PROCESSING METHOD, AND COMPUTER-READABLE STORAGE MEDIUM

(75) Inventor: Shukei Kurihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 785 days.

(21) Appl. No.: 12/468,217

(22) Filed: May 19, 2009

(65) Prior Publication Data

US 2009/0296119 A1   Dec. 3, 2009

(30) Foreign Application Priority Data

May 27, 2008   (JP) ................................. 2008-138250

(51) Int. Cl.
    *G06K 15/00*   (2006.01)
    *G06F 3/12*    (2006.01)
(52) U.S. Cl. ......... 358/1.18; 358/1.1; 358/1.12; 358/1.9
(58) Field of Classification Search .................... None
    See application file for complete search history.

(56) References Cited

U.S. PATENT DOCUMENTS 6,549,299 B1 * 4/2003 Allen et al. ................. 358/1.18
2007/0229904 A1 10/2007 Mori

FOREIGN PATENT DOCUMENTS

JP   2006-051797 A   2/2006
JP   2007-272780     10/2007

* cited by examiner

*Primary Examiner* — Dov Popovici
(74) *Attorney, Agent, or Firm* — Canon USA Inc. IP Division

(57) ABSTRACT

A document processing system includes a printing apparatus configured to perform printing and a post-processing apparatus configured to execute post-processing on a print product. The document processing system includes a setting unit configured to set a sheet-feeding direction of the print product to be fed to the post-processing apparatus, and a print control unit configured to control the printing apparatus to print on the print product a mark indicating the sheet-feeding direction set by the setting unit.

13 Claims, 25 Drawing Sheets

FIG.5

| NO | ATTRIBUTE | SETTING VALUE | APPLICATION |
|---|---|---|---|
| 1 | PRINT METHOD | ONE-SIDED/TWO-SIDED | |
| 2 | SHEET SIZE | ORIGINAL SIZE/ FIXED SIZE | REGULAR SHEETS AND USER-DEFINITION SHEET ARE INCLUDED IN "FIXED SIZE" |
| 3 | SHEET ORIENTATION | PORTRAIT/LANDSCAPE | SELECTABLE ONLY FOR "FIXED SIZE" |
| 4 | IMPOSITION METHOD | LEAF, SADDLE STITCH, 4-FOLD | NUMBER OF PATTERNS CAN BE DESIGNATED IF IMPOSITION METHOD IS "LEAF" |
| 5 | FINISHING SIZE | SAME AS OUTPUT SHEET SIZE, FIXED SIZE | "FIXED SIZE" IS SIMILAR TO SHEET SIZE. AUTOMATIC ADJUSTMENT BASED ON NUMBER OF PATTERNS AND SHEET SIZE IS FEASIBLE. |
| 6 | N-UP | 1×1, 2×1, 2×2,... | DETAILED SETTINGS (E.G., LAYOUT ORDER, LAYOUT METHOD) CAN BE DESIGNATED |
| 7 | BINDING METHOD | NORMAL, CASE, SADDLE STITCH, 4-FOLD | |
| 8 | ENLARGE/REDUCE | ON/OFF | |
| 9 | HEADER/FOOTER | | INDIVIDUAL DESIGNATION FOR EACH ORIGINAL OR FINISHING SIZE IS FEASIBLE |
| 10 | WATERMARK | | INDIVIDUAL DESIGNATION FOR EACH ORIGINAL OR FINISHING SIZE IS FEASIBLE |
| 11 | FINISHING | STAPLE, Z-FOLD, PUNCH HOLE | TWO OR MORE ITEMS CAN BE SET |
| 12 | BINDING MARGIN | | SHIFTING/REDUCTION IS FEASIBLE |
| 13 | FRONT COVER/ BACK COVER | | DESIGNATION OF SHEET-FEEDING METHOD |
| 14 | INDEX SHEET | | SHEET FEEDING METHOD AND TAB PRINT CAN BE DESIGNATED |
| 15 | INTERLEAF | | DESIGNATION OF SHEET-FEEDING METHOD. DESIGNATION OF PRINTING ON INTERLEAF IF NECESSARY. |
| 16 | CHAPTER BREAK | NO BREAK, PAGE BREAK, PAPER BREAK | "PAPER BREAK" IS APPLIED WHEN "INDEX SHEET" OR "INTERLEAF" IS DESIGNATED. SAME PROCESSING IS APPLIED TO "PAGE BREAK" AND "PAPER BREAK" FOR ONE-SIDED PRINTING. |
| 17 | REGISTER MARK/BLEED | REGISTER MARK ON/OFF, BLEED SIZE ON EACH SIDE | |
| 18 | SHEET-FEEDING DIRECTION | UP, DOWN, LEFT, RIGHT | |
| 19 | ORIGIN OF POST-PROCESSING | RIGHT SIDE OF SHEET, LEFT SIDE OF SHEET | |

FIG.6

| NO | ATTRIBUTE | SETTING VALUE | APPLICATION |
|---|---|---|---|
| 1 | SHEET SIZE | ORIGINAL SIZE/ FIXED SIZE | REGULAR SHEETS AND USER-DEFINITION SHEET ARE INCLUDED IN "FIXED SIZE" |
| 2 | SHEET ORIENTATION | PORTRAIT/LANDSCAPE | SELECTABLE ONLY FOR "FIXED SIZE" |
| 3 | N-UP | 1×1, 2×1, 2×2,... | DETAILED SETTINGS (E.G., LAYOUT ORDER, LAYOUT METHOD) CAN BE DESIGNATED |
| 4 | ENLARGE/ REDUCE | ON/OFF | |
| 5 | WATERMARK | | WHETHER TO DISPLAY WATERMARK DESIGNATED BY BOOK CAN BE DESIGNATED |
| 6 | HEADER/ FOOTER | | WHETHER TO DISPLAY WATERMARK DESIGNATED BY BOOK CAN BE DESIGNATED |
| 11 | FINISHER | STAPLE, Z-FOLD, PUNCH HOLE | "OFF" IS SELECTABLE WHEN STAPLE IS DESIGNATED BY BOOK |

FIG.7

| NO | ATTRIBUTE | SETTING VALUE | APPLICATION |
|---|---|---|---|
| 1 | PAGE ROTATION DESIGNATION | 0, 90, 180, 270 | |
| 2 | WATERMARK | | WHETHER TO DISPLAY WATERMARK DESIGNATED BY BOOK CAN BE DESIGNATED |
| 3 | HEADER/FOOTER | | WHETHER TO DISPLAY WATERMARK DESIGNATED BY BOOK CAN BE DESIGNATED |
| 4 | ZOOM | 50% - 200% | MAGNIFICATION RELATIVE TO N-UP LAYOUT STATE (= 100%) IS ADJUSTABLE |
| 5 | PAGE DIVISION | | |

FIG.10

| PRIORITY | ORIGINAL INFORMATION | DEFAULT SHEET-FEEDING DIRECTION |
|---|---|---|
| 1 | A3 SHEET | (1) |
| 2 | BINDING MARGIN | (1) to (4) |
| 3 | LANDSCAPE | (1) |
| 4 | PORTRAIT | (3) |
| 5 | 2-UP | (1) |

FIG.17

| SETTING OF FEEDING DIRECTION OF SHEET SUPPLIED TO FINISHER |
|---|

☑ SET FEEDING DIRECTION OF SHEET
SUPPLIED TO FINISHER

SHEET-FEEDING DIRECTION (RELATIVE TO ORIGINAL)

● UP
○ DOWN
○ RIGHT
○ LEFT

☑ ADD JOB ID TO ORIGINAL

☑ TRANSMIT LEADING PAGE IMAGE TO FINISHER

[ OK ]   [ CANCEL ]

~1700

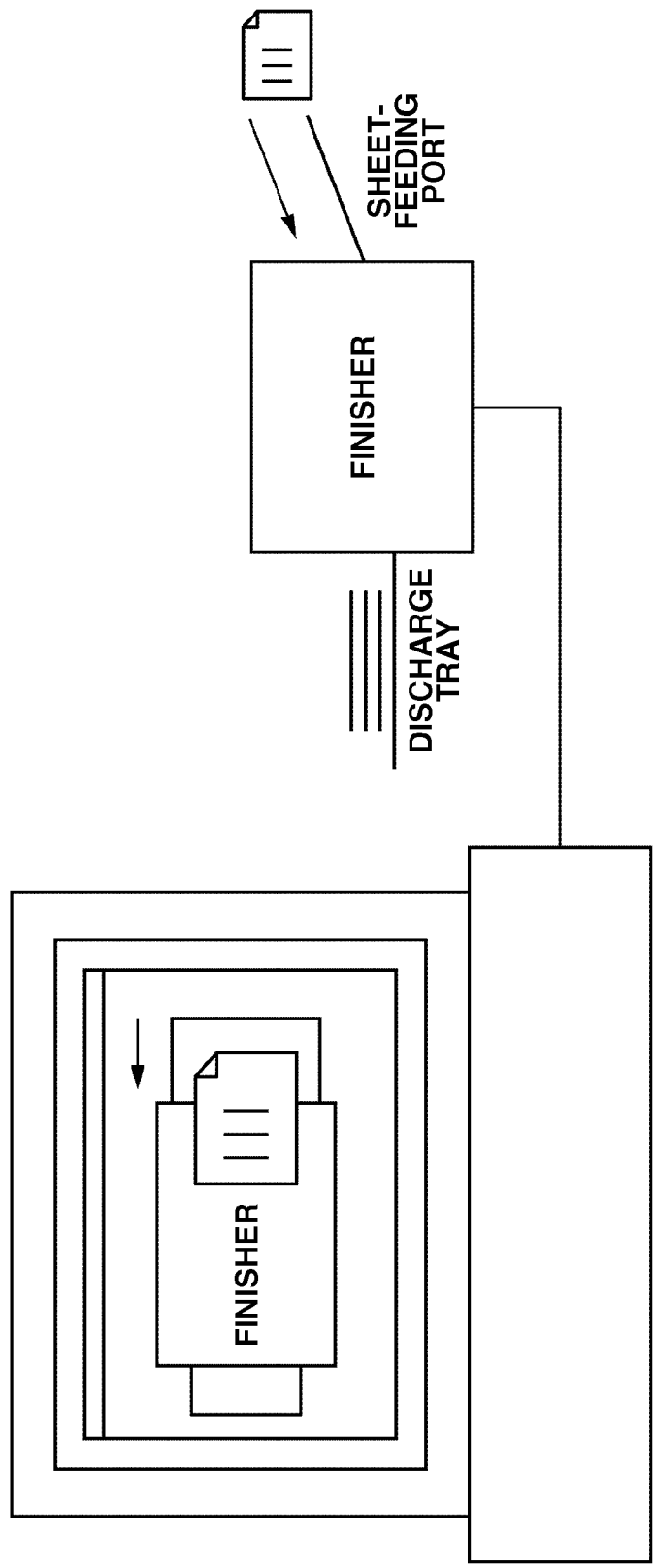

DOCUMENT PROCESSING SYSTEM, DOCUMENT PROCESSING METHOD, AND COMPUTER-READABLE STORAGE MEDIUM

BACKGROUND OF THE INVENTION

1. Field of the Invention

The present invention relates to a document processing system including a printing apparatus that can perform printing and a post-processing apparatus that can execute post-processing on a print product.

2. Description of the Related Art

Many of conventional printing companies are still using large-scale printing apparatuses, such as offset-type printing machines, to produce print products according to orders and deliver the finished products to clients.

On the other hand, recent electro-photographic printing apparatuses can provide high-speed and high-quality outputs. A business model newly introduced for such advanced printing apparatuses is called "Print On Demand (i.e., POD)", which can accept an order of a relatively smaller lot of job.

In the POD market, instead of using a conventional large-scale printing machine or system, advanced functions of digital image processing apparatuses including digital copying machines and digital multifunction peripherals can be fully used to realize a digital print of electronic data. An imposition application usable in this case can determine a print layout of an input original that may include image data and vector format (e.g., Portable Document Format (PDF)) data. In this manner, the POD market is highly digitized compared to the conventional market of the printing industry and a computer-based management/control can be widely employed.

A near-line finisher is a post-processing apparatus (i.e., a finisher) that can perform post-processing (i.e., finishing processing) on print products. The near-line finisher can communicate with a printing apparatus and its control apparatus (e.g., a computer). However, the near-line finisher is basically independent of the printing apparatus and has various functions excellent in both extensibility and alternativeness. The near-line finisher can receive an electronic job ticket of, for example, Job Definition Format (JDF), via a communication tool, and can process the job according to the contents described in the job ticket. In this respect, the near-line finisher can contribute to automation of print processing.

Although the job ticket can designate detailed contents for automating the processing performed by a finisher, the finisher generally requires an operator's manual work to set each print product to the finisher after the print product is output from the printer. For example, when a print product requires cutting processing that can be performed by the finisher, a register mark indicating a cutting position may be printed on a print product. The finisher performs cutting processing according to the mark.

If the register mark is printed on all pages of a print product and the bookbinding processing is performed, the marks may mutually deviate in registration position and some of the printed marks may remain on the print product without being removed in the cutting operation. Therefore, as discussed in Japanese Patent Application Laid-Open No. 2007-272780, it may be useful to print register marks only on the leading page because the marks printed on the topmost sheet are sufficient to be recognized.

However, if information available for an operator is limited to only the printed register marks, it may be difficult for the operator to identify the correct orientation of each print product relative to a finisher. In many cases, a job creator (i.e., an operator who generates a job) is different from a finisher's operator who actually sets a print product to a finisher. Therefore, the finisher's operator may ask the job creator about the setting direction of each print product. Thus, the work efficiency may be reduced.

SUMMARY OF THE INVENTION

Exemplary embodiments of the present invention are directed to a technique capable of overcoming or at least mitigating the above-described problems.

According to an aspect of the present invention, at least one exemplary embodiment is directed to a document processing system that includes a printing apparatus configured to perform printing and a post-processing apparatus configured to execute post-processing on a print product. The document processing system includes a setting unit configured to set a sheet-feeding direction of the print product to be fed to the post-processing apparatus, and a print control unit configured to control the printing apparatus to print on the print product a mark indicating the sheet-feeding direction set by the setting unit.

According to exemplary embodiments of the present invention, an operator can accurately set a print product to the post-processing apparatus without failing in adjusting the orientation of the print product relative to the post-processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 5 illustrates an example of book setting information according to an exemplary embodiment of the present invention.

FIG. 6 illustrates an example of chapter setting information according to an exemplary embodiment of the present invention.

FIG. 7 illustrates an example of page setting information according to an exemplary embodiment of the present invention.

FIG. 10 illustrates an example of a sheet-feeding side prediction table according to an exemplary embodiment of the present invention.

FIG. 17 illustrates an example of the "sheet-feeding direction setting" window that can be used by the bookbinding application according to an exemplary embodiment of the present invention.

FIG. 25 illustrates an example of a configuration of a finisher, which has an image preview function, according to an exemplary embodiment of the present invention.

DETAILED DESCRIPTION OF THE EMBODIMENTS

Figure 1:
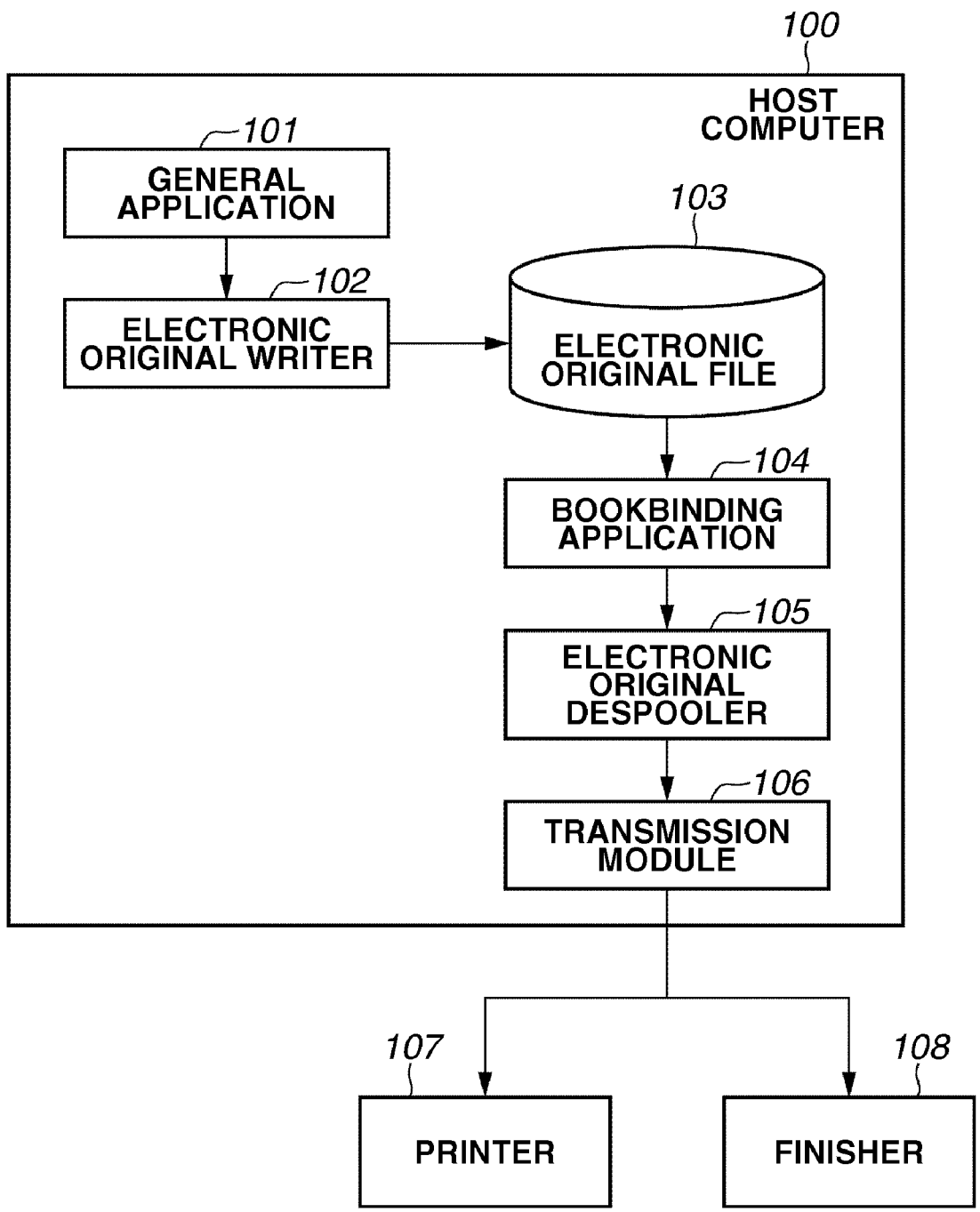
FIG. 1 is a block diagram illustrating an example of a software configuration of a document processing system according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Various exemplary embodiments, features, and aspects of the invention will be described in detail below with reference to the drawings.

A document processing system according to a first exemplary embodiment of the present invention includes a general application that can generate a data file and an electronic original writer that can convert the generated data file into an electronic original file. The document processing system further includes a bookbinding application that can edit the electronic original file. Although respective functions are separately described in the following description, an application that integrates the above-described functions may be also provided.

FIG. 1 illustrates a software configuration of a document processing system according to the present exemplary embodiment. The document processing system can be, for example, constituted by a host computer 100. A general application 101 is an application program that can provide various functions (e.g., word-processing, spreadsheet, paint, presentation, and text editing). The general application 101 further includes a print function for an operating system (hereinafter, referred to as "OS").

The general application 101 can use a predetermined interface, which may be provided by the OS, in printing application data including the generated document data and image data. The interface is generally referred to as Graphic Device Interface (GDI). The general application 101 can transmit an output command to an output module of the OS. The output command may be referred to as a "GDI function."

The output module converts a received output command into a format that can be processed by an output device (e.g., a printer), and outputs the converted command. This command may be referred to as a Device Driver Interface (DDI) function.

The format that can be processed by each output device is variable depending on the type of the device, a maker (or a manufacturer), or a machine model. Hence, a device driver may be provided for each device. The OS can use the device driver to convert a command and generate print data. The OS can generate a print job using a Job Language (JL).

An electronic original writer 102, serving as an improved device driver, is a software module that can realize a document processing system. The electronic original writer 102 is not dedicated to a specific output device, and converts an output command into a format that can be processed by a bookbinding application 104 or a printer driver 106. The converted format obtained by the electronic original writer 102 (hereinafter, referred to as an "electronic original format") can be any format that can express original data on a page-by-page basis. For example, the Portable Document Format (PDF) provided by Adobe Systems or the Scalable Vector Graphics (SVG) format opened by W3C can be used as a standard format.

In one version, when the general application 101 uses the electronic original writer 102, the general application 101 may designate the electronic original writer 102 as a output device driver before instructing print processing. In general, an electronic original file generated by the electronic original writer 102 is imperfect in format as an electronic original file. Therefore, the bookbinding application 104 may designate the electronic original writer 102 as a device driver. The bookbinding application 104 can manage the conversion of application data into an electronic original file. According to one embodiment, the bookbinding application 104 then completes an electronic original file to have a later-described format based on an incomplete electronic original file that may be newly generated by the electronic original writer 102.

As described above, when the electronic original writer 102 is designated as a device driver and the general application 101 prints the data, application data can be converted into an electronic original format including pages (hereinafter, referred to as a "logical page" or an "original page") defined by the general application 101. The converted application data can be stored as the electronic original file 103 into a hard disk or other storage medium. The hard disk can be, for example, a local drive or external memory 211 of the computer 100 that can realize the document processing system according to the present exemplary embodiment, or can be a network drive connected to a network.

In one embodiment, the bookbinding application 104 may read the electronic original file 103 and enables users to edit the read file. However, the bookbinding application 104 may not provide any function for editing the content of each page. In one version, the bookbinding application 104 enables users to edit the structure of a chapter or a book on a page-by-page basis.

When a user instructs printing of the electronic original file 103 edited by the bookbinding application 104, the bookbinding application 104 activates an electronic original despooler 105. In this respect, the bookbinding application 104 functions as a print control unit that generates print data and substantially controls print contents.

The electronic original despooler 105 may be a program module capable of outputting rendering data to the printer driver 106 when a document (i.e., an electronic original file) that may be used by the bookbinding application 104 is printed. The electronic original despooler 105 can be installed on the computer together with the bookbinding application 104.

In one version, the electronic original despooler 105 reads a designated electronic original file from the hard disk, and generates an output command adaptable to the transmission module so as to print each page according to a format described in the electronic original file. The electronic original despooler 105 outputs the generated command to the transmission module 106. In this case, the transmission module 106 transmits the output command received from the electronic original despoiler 105 to the printer 107 and the finisher 108. The printer 107 prints an image according to the output command. The finisher 108, if a print product printed by the printer 107 is set along or by its sheet-feeding port, performs finishing processing according to the command.

Figure 2:
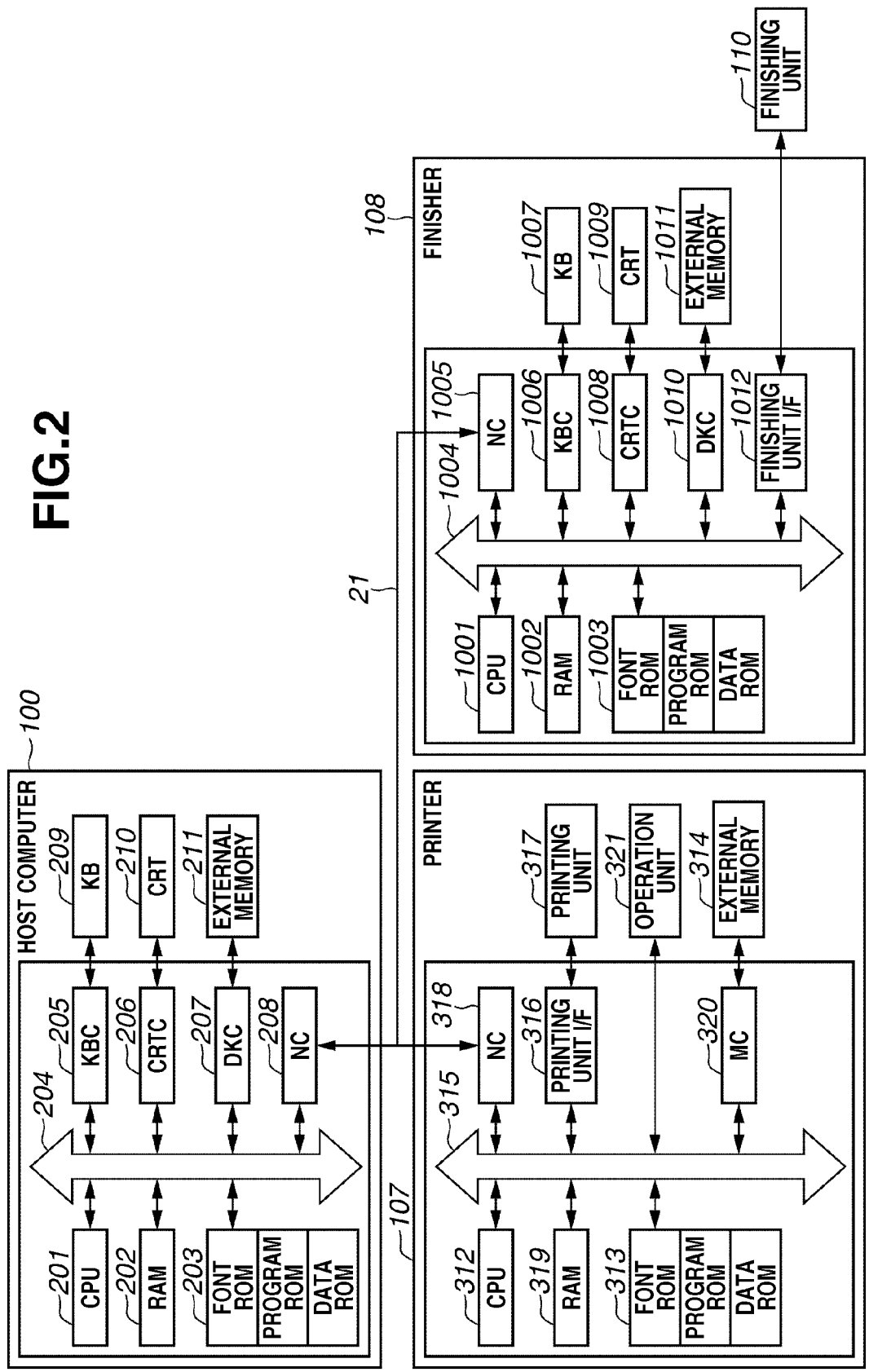
FIG. 2 is a block diagram illustrating an example of a hardware configuration of a document processing system according to an exemplary embodiment of the present invention.

FIG. 2 illustrates a hardware configuration of a document processing system according to the present exemplary embodiment. In the embodiment shown in FIG. 2, the host computer 100 includes a central processing unit (CPU) 201 that can execute document processing on graphics, images, characters, tables (including spread sheets) according to a document processing program that may be stored in a program ROM of a read only memory (ROM) 203 or the external memory 211. The CPU 201 can control each device connected to a system bus 204.

The program ROM of the ROM 203 or the external memory 211 may store an operating system program that can control the CPU 201. A font ROM of the ROM 203 or the external memory 211 may store font data that can be used in the document processing. A data ROM of the ROM 203 or the external memory 211 may store various data that can be used in the document processing and a computer program serving as a document processing application. A random access memory (RAM) 202 can function as a main memory or a work area for the CPU 201.

A keyboard controller (KBC) 205 can control any key input entered through a keyboard (KB) 209 or a pointing device (not illustrated). A cathode ray tube (CRT) controller (CRTC) 206 controls a CRT display device 210. An external memory 211, such as a hard disk (HD) or a floppy disk (FD), can store a boot program, various applications, font data, user files, editing files, and a printer control command generation program (hereinafter, referred to as a "printer driver"). A disk controller (DKC) 207 can control every access to the external memory 211. A network controller (NC) 208 is connected to the printer 107 and the finisher 108 via a network 21. The NC 208 can execute processing for controlling communications that may be performed between the computer 100 and the printer 107 or the finisher 108.

The CPU 201 may execute rasterization processing on outline fonts supplied, for example, to a display information RAM that may be set on the RAM 202 to realize "what you see is what you get" (WYSIWYG) by the CRT 210. The CPU 201 may further open various windows based on commands that can be instructed using a mouse cursor (not illustrated) displayed on the CRT 210, and may execute various data processing. Users can open a window relating to print settings, when they performs printing, and can perform printer settings and finisher settings.

The printer 107 can be controlled by a CPU 312. The CPU 312 can output an image signal as output information to a printing unit (i.e., a printer engine) 317 via a system bus 315 according to a control program that may be stored in a program ROM of a ROM 313 or a control program that may be stored in an external memory 314. The program ROM of the ROM 313 may further store any other control program necessary for the CPU 312. A font ROM of the ROM 313 may store font data that can be used when the above-described output information is generated. A data ROM of the ROM 313 may store information used by the host computer 100 when the printer 107 does not include the external memory 314 (e.g., a hard disk).

A network I/F 318 enables the CPU 312 to communicate with the host computer 100 to transmit information from the printer 107 to the host computer 100. A RAM 319 is capable of functioning as a main memory or a work area for the CPU 312.

A CPU 1001 can control the finisher 108. The CPU 1001 may output a signal as finishing information to a finishing unit 110 connected to a system bus 1004 according to a control program stored in a program ROM of the ROM 1003 or in an external memory 1011. The program ROM of the ROM 1003 may further store any other control program necessary for the CPU 1001.

A network I/F 1005 enables the CPU 1001 to communicate with the host computer 100. A RAM 1002 is capable of functioning as a main memory or a work area for the CPU 1001.

Prior to a detailed description of the bookbinding application 104, an example data format of the above-described electronic original file is described below.

Figure 3:
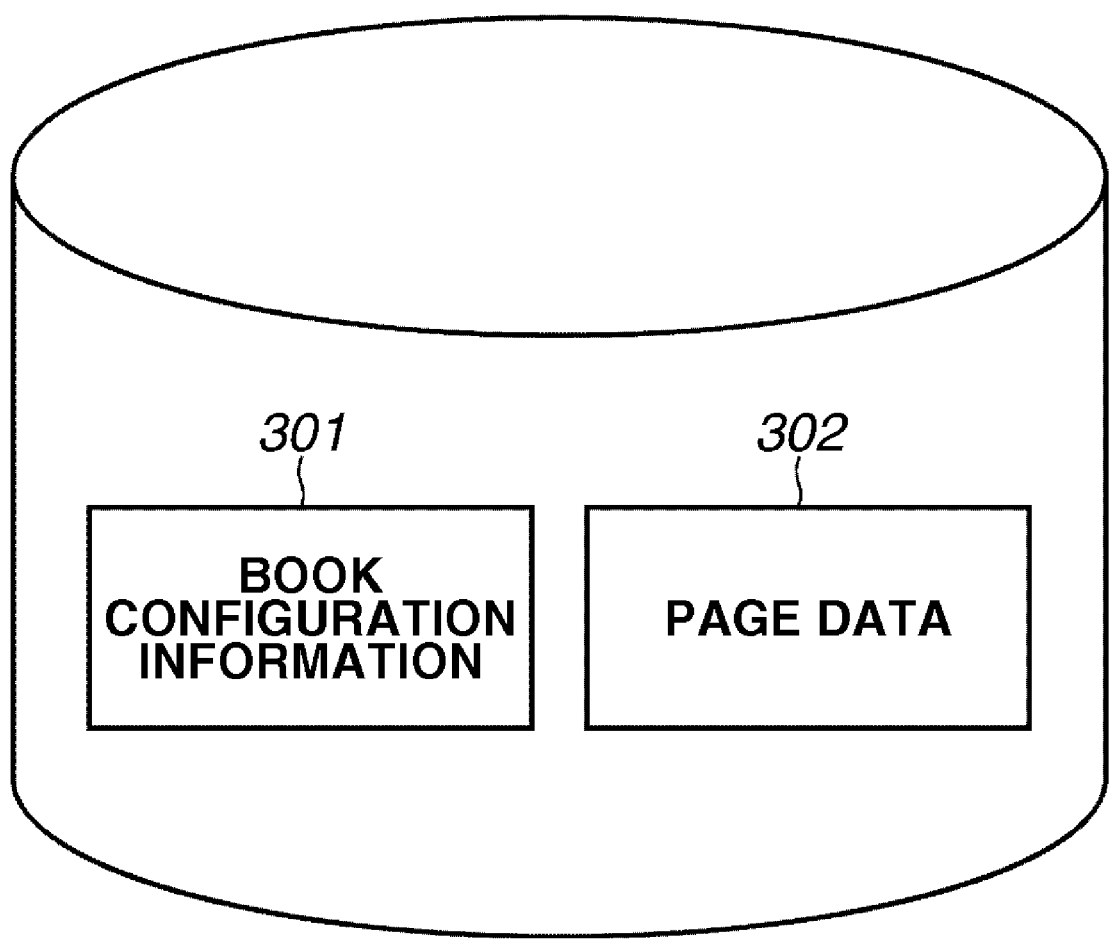
FIG. 3 illustrates an example of a structure of an electronic original file according to an exemplary embodiment of the present invention.

FIG. 3 illustrates an electronic original file that can be roughly classified into book configuration information 301 and page data 302. The area of the page data 302 pools a plurality of pages that may be added to an electronic original file. The book configuration information 301 may store a configuration that defines a structure of respective pages.

Figure 4:
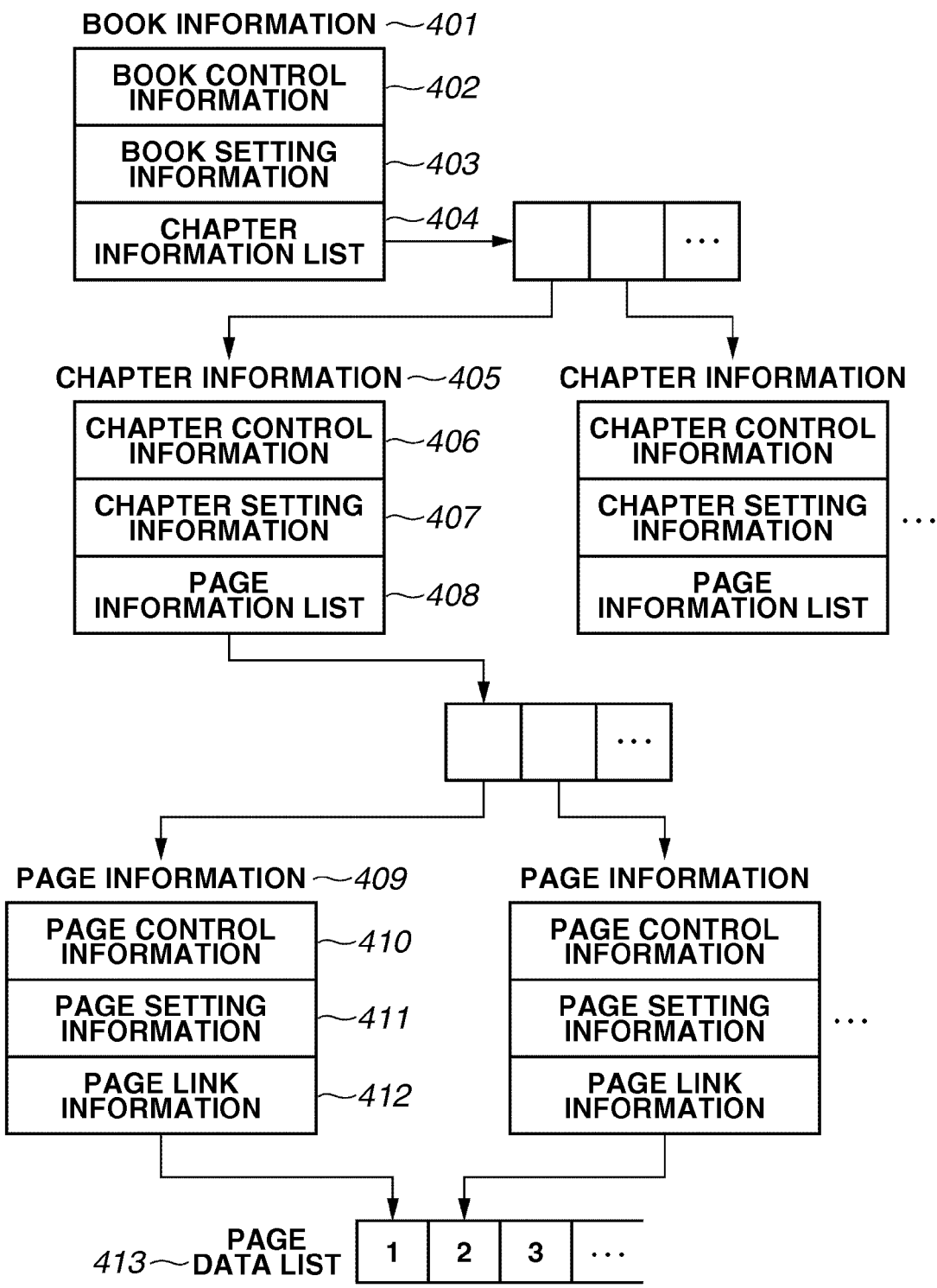
FIG. 4 illustrates an example of a structure of book configuration information according to an exemplary embodiment of the present invention.

FIG. 4 illustrates an example of a detailed data structure of the book configuration information 301. The example illustrated in FIG. 4 is a three-layered structure that resembles a book made of paper. An upper layer is referred to as a "book" resembling a single book, which can define an attribute relating to the entire document. An intermediate layer, which is subordinated to the upper layer, is referred to as a "chapter" that corresponds to a chapter of a book. Each "chapter" can define an attribute of each chapter. A lower layer is referred to as a "page" that corresponds to each page defined by an application program. Each "page" can define an attribute of each page. One "book" may include a plurality of chapters. One "chapter" may include a plurality of "pages."

The "book", "chapter", and "page", which may constitute an electronic original file, are denoted by corresponding nodes. One electronic original file includes one "book." Both the "book" and the "chapter" are the concept that defines a book structure and includes defined attribute values and a link to a lower layer and its entity. The "page" includes data for each page that may be generated by the application program as its entity. Therefore, the "page" includes the entity of an original page (i.e., original page data) and a link to each original page data, in addition to its attribute values. A print page that may be output to a paper medium may include a plurality of original pages. The structure may not be displayed with a link and may be displayed as part of the attributes for the "book", the "chapter", or the "page."

Book information 401, which may be positioned as highly-ranked information, may be roughly classified into three parts (i.e., book control information 402, book setting information 403, and chapter information list 404). The book control information 402 may include a path name, which indicates a file system of each document file. The book setting information 403 may include layout information (e.g., page layout) and printer function setting information (e.g., staple) The book setting information 403 corresponds to the book attribute. The chapter information list 404 may include an assembly of chapters of a document that are formatted as a list. For example, the chapter information list 404 includes chapter information 405.

The chapter information 405 may be roughly classified into three parts (i.e., chapter control information 406, chapter setting information 407, and page information list 408) The chapter control information 406 may include information relating to a chapter name. The chapter setting information 407 may include information relating to a page layout or staple information peculiar to each chapter. The chapter setting information 407 corresponds to the chapter attribute. A document having a complicated layout can be generated by setting the chapter setting information 407 for each chapter. For example, a 2-UP layout may be selected for the first chapter and a 4-UP layout may be selected for another chapter. The page information list 408 may include an assembly of original pages constituting each chapter that are formatted as a list. The page information list 408 may instruct page information data 409.

The page information 409 may be roughly classified into three parts (i.e., page control information 410, page setting information 411, and page link information 412). The page control information 410 may include information relating to a page number that may be displayed on the tree. The page setting information 411 may include information relating to a rotational angle of each page and page location information. The page setting information 411 corresponds to the original page attribute. The page link information 412 may include original data corresponding to a page. According to the example illustrated in FIG. 4, the page information 409 includes only the page link information 412. Instead, a page data list 413 may include the original data itself.

FIG. 5 illustrates an example list of the book attribute (i.e., book setting information 403), an item of which, if defined in both upper and lower layers, describes its effective attribute value in the lower layer (e.g., "chapter" or "page"). Therefore, an item involved only in the book attribute has an attribute value that is valid in the entire book. However, an item defined in both the book attribute and a lower layer has a valid content being set for the book attribute. However, as described below, the present exemplary embodiment can select whether to prioritize the attribute value of a lower layer. In the example illustrated in FIG. 5, each item may not correspond to a single item and may include two or more relevant items.

The book attribute may be configured to include an attribute item, a setting value, and its application. In the present exemplary embodiment, a total of ten items of "print method", "imposition method", "finishing size", "binding method", "binding margin", "front cover/back cover", "index sheet", "interleaf", "chapter break", and "register mark/bleed" are attribute items unique to the book attribute and are valid throughout the book.

The "print method" attribute enables users to designate, as a print method, "one-sided printing" or "two-sided printing."

The "imposition method" attribute enables users to designate, as an imposition method, "leaf", "saddle stitch", or "4-fold." The "leaf" is an imposition method for stitching finished sheets without folding them. The "saddle stitch" is an imposition method for performing a layout suitable for a bookbinding operation that may include folding a bundle of a designated number of sheets along a designated line and stitching the folded bundle to form a book. Although not illustrated in the drawings, if the "saddle stitch" is designated, detailed attributes (e.g., opening direction, and number of sheets constituting a bundle) can be further designated. The "4-fold" is an imposition method for performing a layout suitable for a bookbinding operation that may include folding a plurality of sheets in each of the vertical and horizontal directions and then cutting each folded portion of the sheets in a 4-folded state. Detailed setting items (e.g. right stitch/top fold and right stitch/left fold) may be set according to the folded position and the stitch direction.

The "finishing size" designates the cutting size of sheets when a plurality of pages are generated by cutting the sheets. A representative example is a format according to which two finishing sizes of A4 are imposed on an A3 Nobi size. The "binding method" includes "normal", "case (case binding)", "saddle stitch", and "4-fold." The "binding margin" includes a designation of adding a binding margin in a printing operation of an electronic original file that may be formed as a book. Shifting/reduction of a setting value of the binding margin is feasible. The "case (case binding)" is a binding format capable of realizing a case bookbinding that may be performed by an in-line finisher or an off-line finisher.

The case binding includes gluing a printed bookblock stack at the binding position, binding the bookblock stack with a cover, and performing a three-way cutting if necessary. The "4-fold" is a format capable of forming a bundle of 4-folded output sheets for the adhesive binding, and a method for performing imposition of print pages. The adhesive binding can be realized by an off-line finisher that performs three-way cutting or four-way cutting.

The "front cover/back cover" attribute enables users to add a front cover and a back cover for an electronic original file that may be printed as a book and designate print contents on the added covers. The "index sheet" attribute enables users to designate an insertion of an eared index sheet, as a break of a chapter, which can be separately prepared for a printing apparatus and also enables users to designate print contents on the index eared portions. The "index sheet" attribute may be valid for a printing apparatus equipped with an inserter that can insert a specially provided sheet into a predetermined position of the printed sheets. The "index sheet" attribute may also be valid when a printer has a plurality of sheet-feeding cassettes. The same thing may be applied to the "interleaf" attribute.

The "interleaf" attribute enables users to designate, as a break of a chapter, an insertion of a sheet supplied by an inserter or from a sheet-feeding cassette and, if an interleaf is inserted, designate a sheet-feeding source.

The "chapter break" attribute enables users to designate the usage of a new sheet or the usage of a new print page at a breakpoint of the chapter. When a user selects the "one-sided printing", usage of a new sheet and usage of a new print page are not different in the meaning. If a user designates the "usage of a new sheet" in the two-sided printing, consecutive chapters cannot be printed on the same paper. On the other hand, if a user designates the "usage of a new print page", consecutive chapters may be printed on front and back surfaces of a sheet.

The "register mark/bleed" attribute enables users to designate a printing of a register mark and setting a bleed on a print page when an electronic original file is printed. The bleed area (i.e., bleed width) can be set on each side of a finishing page and presents the width of a portion to be removed when the printed sheet is cut. The register mark (i.e., a bleed position mark) is a mark indicating the position along which an off-line finisher can perform cutting operation.

FIG. 6 illustrates a list of chapter attributes (i.e., chapter setting information 407). FIG. 7 illustrates a list of page attributes (i.e., page setting information 411). The relationship between the chapter attributes and the page attributes is similar to the relationship between the book attributes and its lower layer attributes.

The chapter attributes do not include any item(s) unique to the chapter. All of the chapter attributes are involved in the book attributes. Accordingly, if the definitions in the chapter attributes disagree with definitions in the book attributes, the values defined in the chapter attribute are prioritized over the values defined in the book attributes. However, the present exemplary embodiment allows selecting whether to prioritize the attribute value of a lower layer, as described below.

In FIG. 6, five items of "sheet size", "sheet orientation", "N-up print designation", "enlarge/reduce", and "discharge method (i.e., finishing)" are commonly included in the book attributes and the chapter attributes. As described above, the "sheet size" indicates the size of a print sheet. If the case bookbinding and the 2-fold bookbinding (corresponding to the above-described bookbinding print) are not selected, the sheet size can be changed for each chapter. The "sheet orientation" indicates "portrait (i.e., vertical layout)" or "landscape (i.e., horizontal layout)."

The "N-up print designation" attribute is an item enabling users to designate the number of original pages on a piece of printed paper. For example, a user can select a page layout selected from the N-up group including 1×1, 1×2, 2×2, 3×3, and 4×4. If the "enlarge/reduce" attribute is ON, an input original page can be enlarged and reduced according to an output sheet size. The "discharge method (i.e., finishing)" attribute is an item enabling users to determine whether staple processing for discharged sheets is performed, although the "paper discharge method" attribute may be valid for a printing apparatus having a stapling function.

In FIG. 7, "page rotation designation", "zoom", and "page division" are items unique to the page attributes. The "page rotation designation" attribute is an item enabling users to designate a rotational angle of an original page that may be disposed on a print page. The "zoom" attribute is an item enabling users to designate a zoom ratio of an original page. The zoom ratio defines a size relative to a virtual logical page region (i.e., 100%). The virtual logical page region may be a region occupied by one original page when the original page is disposed according to an N-up designation. For example, if the selected page layout is 1×1, the virtual logical page region is a region corresponding to one printed page. If the selected page layout is 1×2, the virtual logical page region is a reduced region having each side equivalent to approximately 70% of a corresponding side of one printed page.

Two attribute items "watermark" and "header/footer" are commonly included in the "book", "chapter", and "page" attributes. The "watermark" is an image or a character string which can be superposed on print data generated by an application. The "header/footer" is information added in a top margin and/or a bottom margin that may be printed on each page. The "header/footer" can include any parameters, such as a page number and date/time, which are variable.

The contents designated in the "watermark" attribute and the "header/footer" attribute are similarly defined in the chapter attributes and the page attributes. The "book" attributes are different from the "chapter" attributes and the "page" attributes. The "book" attributes can define the contents of the "watermark" and the "header/footer" and also designate print methods of the "watermark" and the "header/footer" throughout the book. On the other hand, the "chapter" attributes and the "page" attributes can determine whether the "watermark" and the "header/footer" defined in the book attributes are applied to each "chapter" or each "page."

Examples of the "electronic original file" may include the above-described structure and contents. The bookbinding application 104 and the electronic original writer 102 may generate an electronic original file according to the following procedure. Generation of an electronic original file may partly constitute an electronic original file editing operation that can be performed by the bookbinding application 104.

Figure 8:
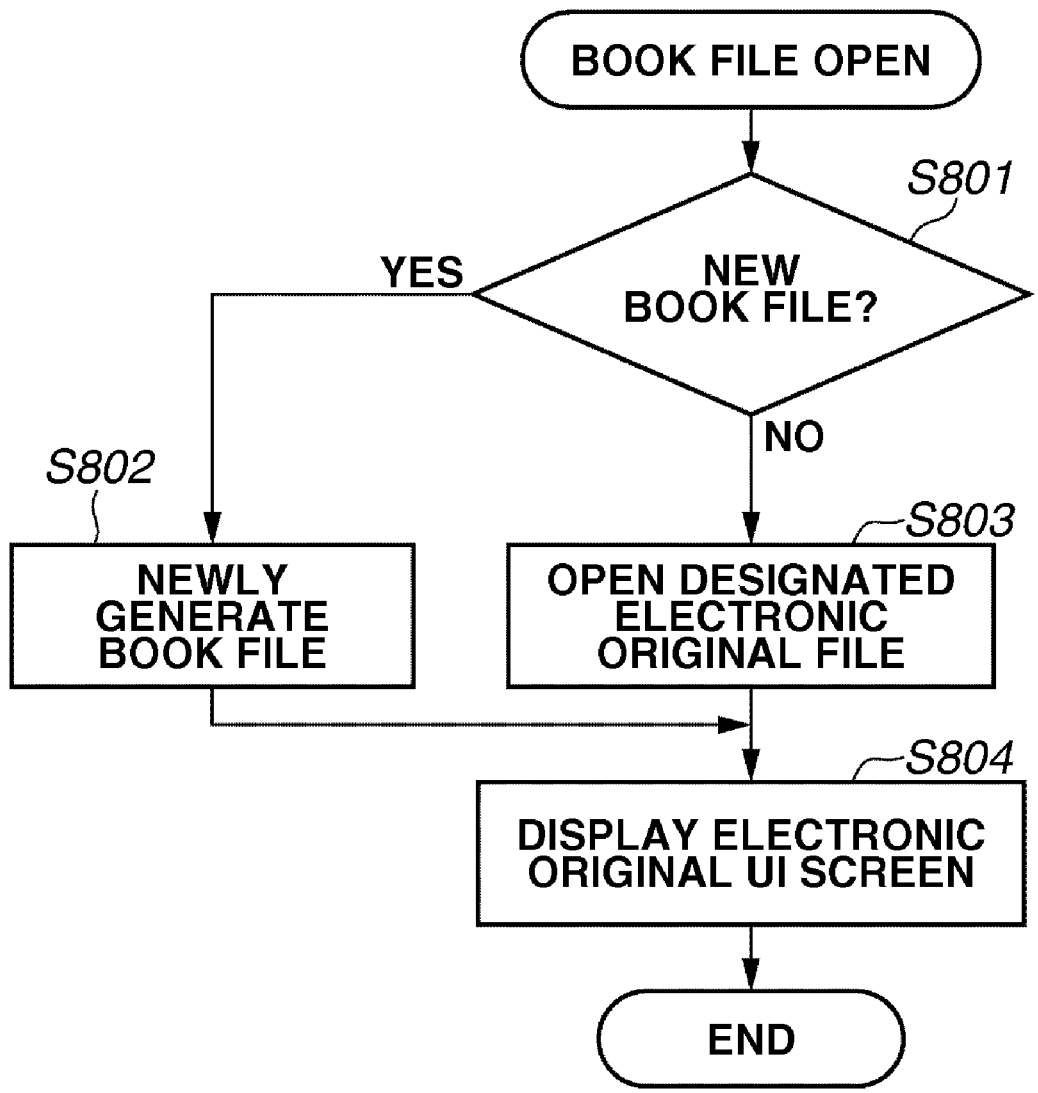
FIG. 8 is a flowchart illustrating an example of a procedure for opening an electronic original file according to an exemplary embodiment of the present invention.

FIG. 8 is a flowchart illustrating a procedure of processing for opening an electronic original file, which can be performed by the bookbinding application 104. The CPU 201 of the host computer 100 can execute the bookbinding application 104 (i.e., a program stored in the ROM 203) to realize the processing of the flowchart illustrated in FIG. 8.

In step S801, the CPU 201 determines whether an electronic original file that may be opened is a new file or an already existing file. If the electronic original file that may be opened is a new file (YES in step S801), then in step S802, the CPU 201 newly generates an electronic original file that does not include any chapter. In the example illustrated in FIG. 4, a newly generated electronic original file is a book node that has only the book information 401 and does not have any link to a chapter node. A set of new attributes can be prepared for the book attribute (i.e., book setting information 403). In step S804, the CPU 201 displays a user interface (UI) screen to enable users to edit the newly generated electronic original file.

Figure 9:
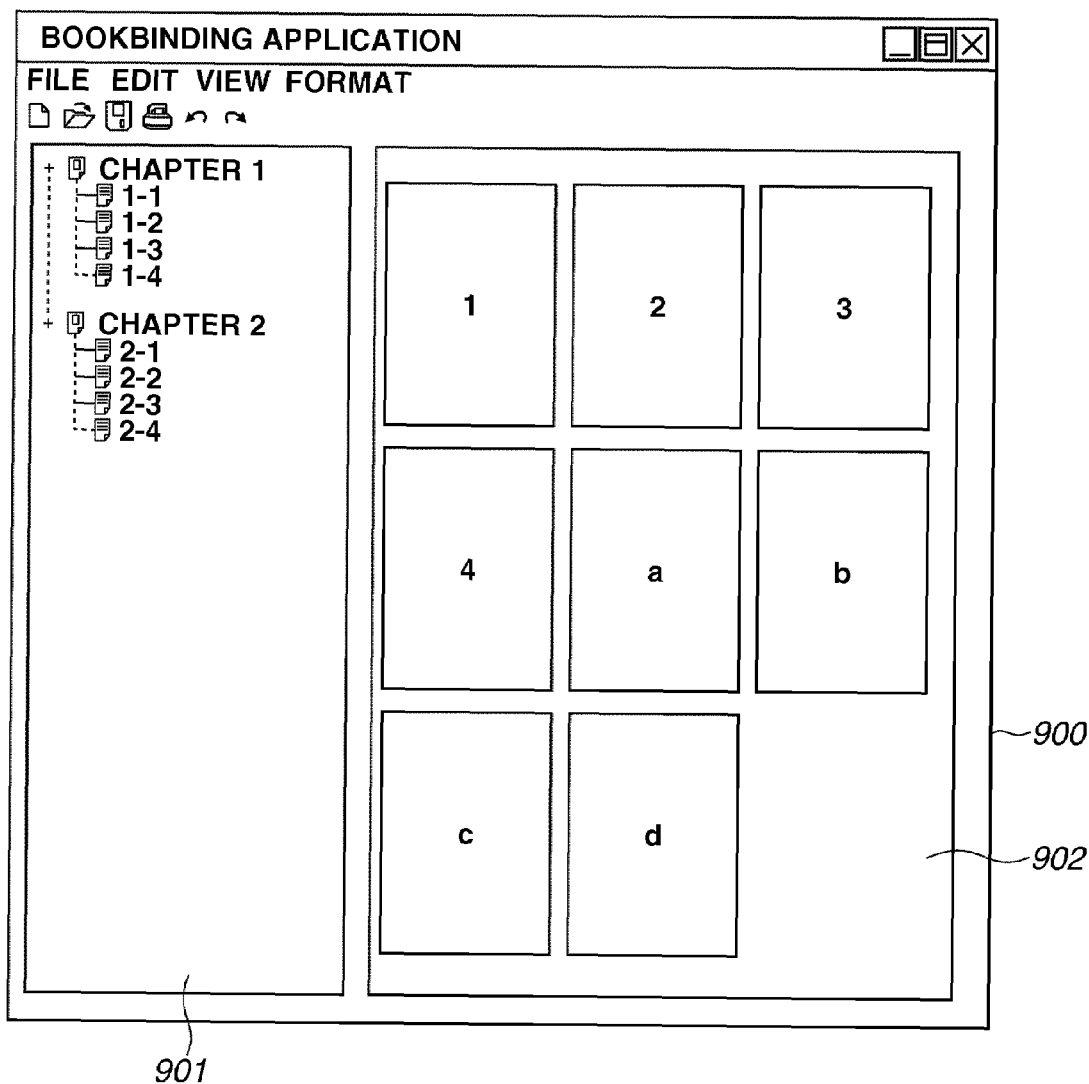
FIG. 9 illustrates an example of a user interface screen, which can be displayed when an existing electronic original file is opened, according to an exemplary embodiment of the present invention.

If the electronic original file that may be opened is an already existing file (NO in step S801), then in step S803, the CPU 201 opens the designated electronic original file. In step S804, the CPU 201 displays a user interface (UI) screen according to the structure, attributes, and contents of the electronic original file. FIG. 9 illustrates an example of the UI screen. A user interface screen 900 includes a tree section 901 that indicates a book structure and a preview section 902 that displays a printed state of each page.

The tree section 901 displays all chapters included in the book and pages included in each chapter so as to form a tree structure as illustrated in FIG. 4. The page that may be displayed in the tree section 901 is a page of the original. The preview section 902 displays a reduced image of each printed page. The display order in the preview section 902 reflects the book structure. If an electronic original file is newly generated, the file does not include any substantial contents and, therefore, the UI displays nothing.

In one version, any application data converted into an electronic original file by the electronic original writer 102 can be added, as a new chapter, to the opened electronic original file. This function may be referred to as an "electronic original import function." When an electronic original is imported to the electronic original file newly generated according to the procedure illustrated in FIG. 8, the electronic original file can possess a substantial entity. The electronic original import function can be activated when a user drags and drops any application data on the UI screen illustrated in FIG. 9.

Through the above-described processing, an electronic original file can be generated based on application data. For example, to determine a page layout, an editing operation can be performed on a generated electronic original file.

An electronic original file, after having been generated and edited as described above, may be printed as a final output. If a user selects a file menu from the UI screen 900 of the bookbinding application 104 illustrated in FIG. 9 and instructs printing of the selected file, a designated output device prints out the selected file. In this case, the bookbinding application 104 may generate a job ticket, as print data, based on the presently opened electronic original file and send the generated job ticket to the electronic original despooler 105. The electronic original despooler 105 can convert the job ticket into a JDF and transmit the JDF and PDF (i.e., image data) to the transmission module 106. The transmission module 106 can transmit the JDF and the PDF to the printer 107 and also transmit the JDF to the finisher 108.

The job ticket may be data whose structure includes original pages (minimum units). The structure of a job ticket can define the layout of original pages on a sheet. One job ticket may be issued for each job. Therefore, a job ticket may include an uppermost-layer node "document" that defines attributes of the entire document, such as two-sided printing/one-sided printing. Sheet nodes, each subordinating to the document node, can include an identifier of a sheet that may be used and designation of a sheet-feeding port of a printer. A node of a sheet printed with a paper may belong to each sheet node. One sheet corresponds to a piece of printing sheet. A printed page (i.e., a physical page) belongs to each sheet. If the print method is one-sided printing, one physical page belongs to one sheet. If the print method is two-sided printing, two physical pages belong to one sheet. An original page disposed thereon belongs to each physical page. The attributes of a physical page may include the layout of an original page.

Figure 12:
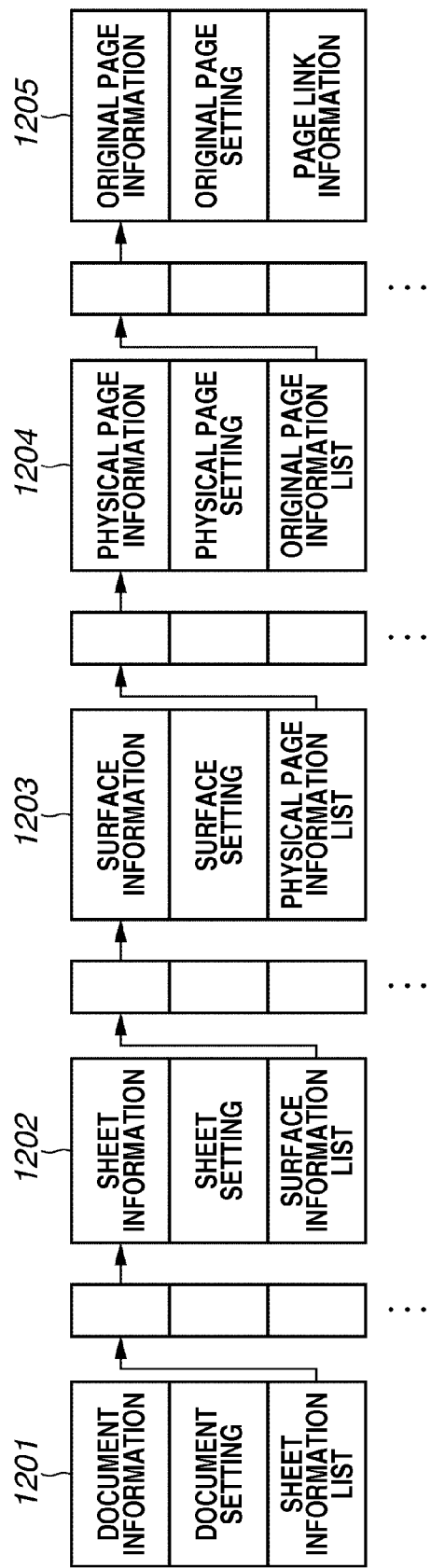
FIG. 12 illustrates an example of a data structure of a job ticket according to an exemplary embodiment of the present invention.

FIG. 12 illustrates an example of the data structure of a job ticket. According to example print data, a document may be configured as an assembly of sheets. Each sheet may include front and rear faces. Each surface includes an area (physical page) where an original can be located. Each physical page may be configured as an assembly of original pages (minimum units).

Document information 1201 may include data relating to the entire document and a list of sheet information constituting the document. Sheet information 1202 may include information relating to a sheet (e.g., sheet size) and a list of surface information disposed on the sheet. Surface information 1203 may include data unique to a surface and a list of physical pages disposed on the surface.

Physical page information 1204 may include information relating to a physical page (size, header/footer, etc.) and a list of original pages constituting a physical page. Original page information 1205 includes an original page setting portion that holds header/footer information, color data information, and layout information (e.g., position, enlarged/reduced size). The original page information 1205 further includes information relating to a link to the page data list 413.

The electronic original despooler 105 converts the above-described job ticket into an output command that may be supplied to the output module.

As described above, the user interface screen 900 illustrated in FIG. 9 can be displayed when an electronic original file is opened by the bookbinding application 104. A tree illustrated in the tree section 901 represents a structure of an opened book (hereinafter, referred to as a "target book"). An exemplary embodiment provides three display methods for the preview section 902, which can be selected by users.

A first display method is referred to as an "original view mode" that directly displays reduced images of original pages belonging to the target book, although the display in the preview section 902 does not reflect any layout. A second display method is referred to as a "print view mode" that displays original page images in the preview section 902 that reflects the layout of the original pages. A third display method is referred to as a "simple print view mode" that does not display any content of each original page in the preview section 902 although the layout is reflected.

The screen illustrated in FIG. 9 can be used as an operation screen for the bookbinding application 104. The bookbinding application 104 enables users to perform function settings (e.g., staple) for a printing apparatus in addition to various editing operations (e.g., change of page order, copy, and deletion of a document), thereby causing a designated printing apparatus to perform printing.

Figure 13:
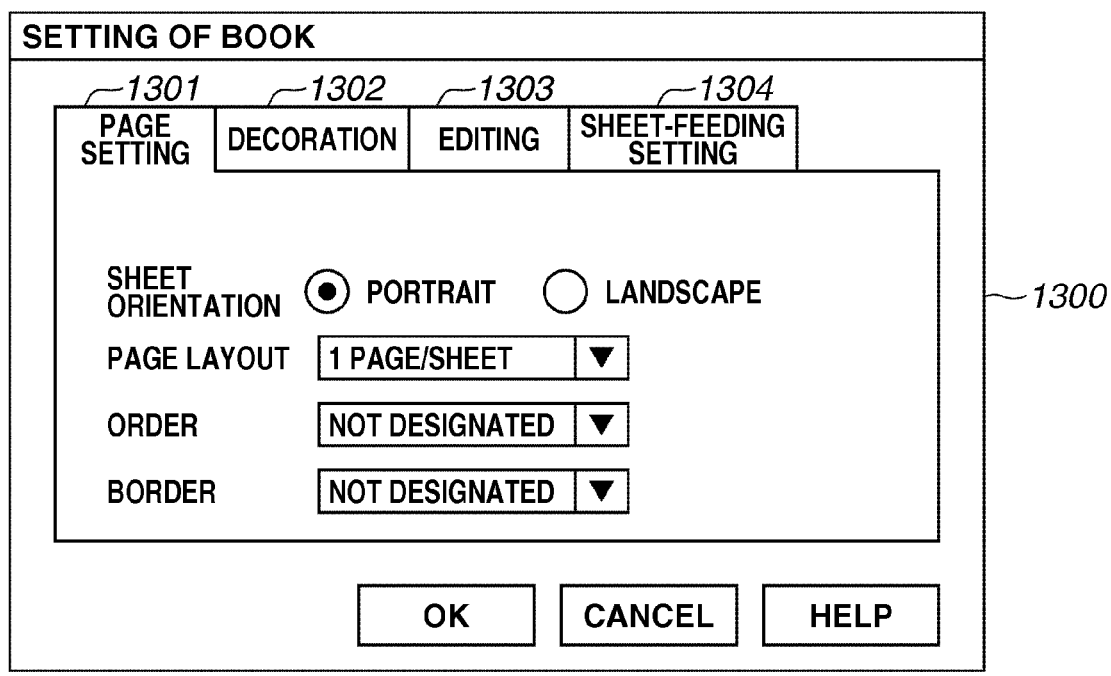
FIG. 13 illustrates a "book setting" window that can be used by a bookbinding application according to an exemplary embodiment of the present invention.

FIG. 13 illustrates a "book setting" window 1300 that can be used by the bookbinding application 104.

The "book setting" window 1300 enables users to display and set the "book setting information 403." The "book setting" window 1300 serves as a window that allows users to perform setting of attributes that may influence the entire document. The "book setting" window 1300 includes four sheets of page setting 1301, decoration 1302, editing 1303, and sheet-feeding setting 1304. According to a state illustrated in FIG. 13, the page setting sheet 1301 is currently selected. The page setting sheet 1301 enables users to instruct settings relating to the layout, such as settings of sheet size, orientation, and N page print.

Figure 14:
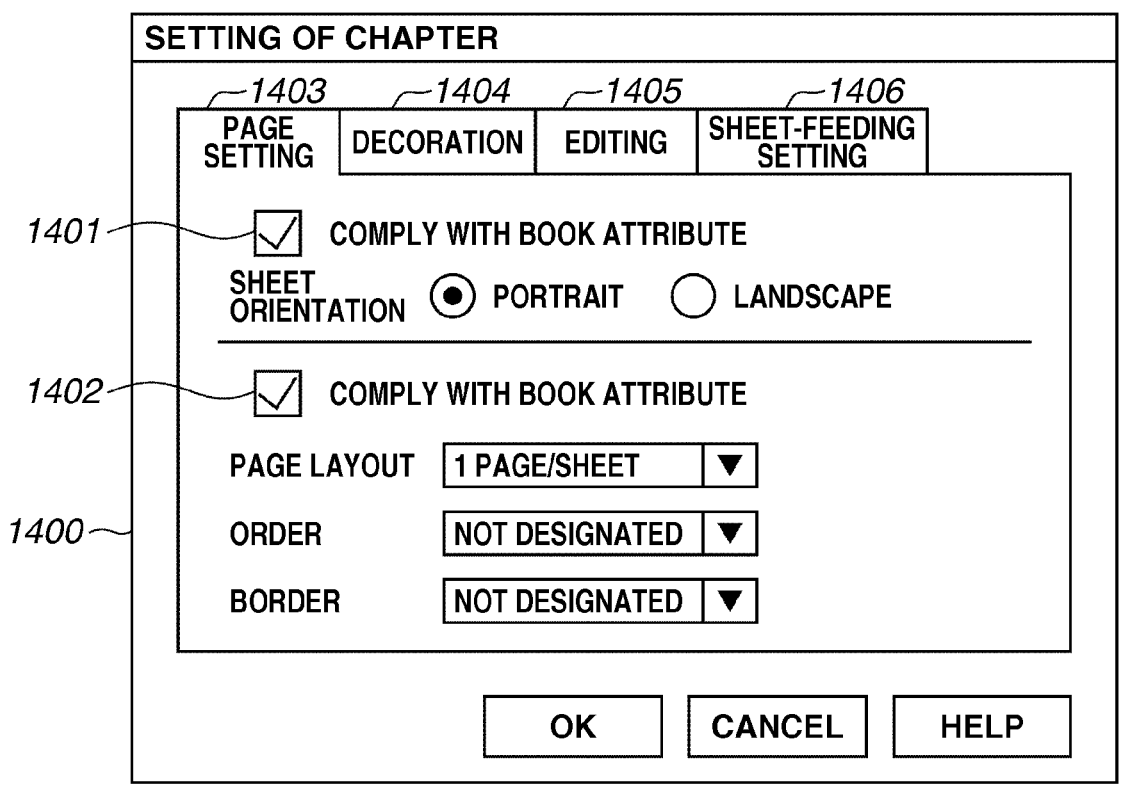
FIG. 14 illustrates a "chapter setting" window that can be used by the bookbinding application according to an exemplary embodiment of the present invention.

FIG. 14 illustrates a "chapter setting" window 1400 that can be used by the bookbinding application 104.

The "chapter setting" window 1400 enables users to display and set the "chapter setting information 407." The "chapter setting" window 1400 serves as a window that allows users to perform setting of attributes that are relevant to the chapter. The "chapter setting" window 1400 includes four sheets of page setting 1403, decoration (i.e., finishing) 1404, editing 1405, sheet-feeding setting 1406.

According to a state illustrated in FIG. 14, the page setting sheet 1403 is currently displayed. The page setting sheet 1403 enables users to perform settings relating to the layout of each chapter, such as settings of sheet size, orientation, and N-page print. The page setting sheet 1403 includes check box controls 1401 and 1402, which can be checked if an attribute item of the "chapter details setting" may comply with the attribute item of the "document details setting." If a check mark is present in the check box of an attribute item illustrated in FIG. 14, the setting value of the book being set in the window 1300 illustrated in FIG. 13 can be applied to the attribute item of the chapter.

Figure 16:
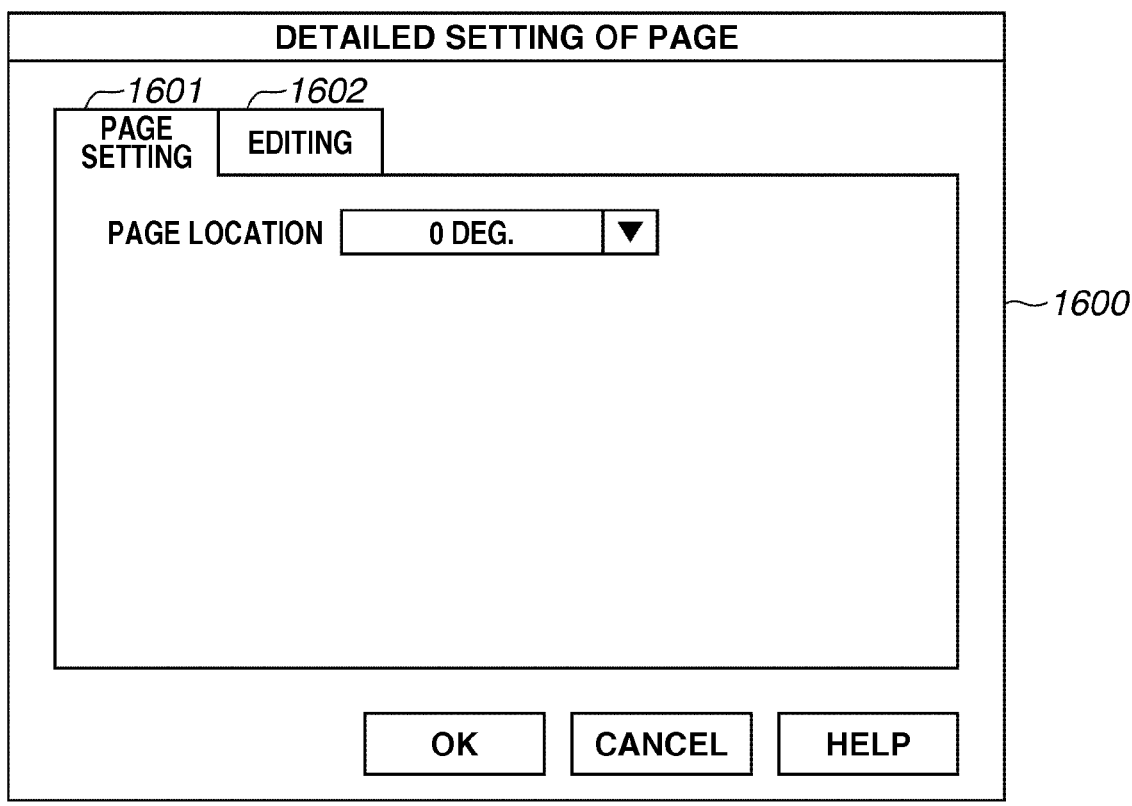
FIG. 16 illustrates a "page details setting" window that can be used by the bookbinding application according to an exemplary embodiment of the present invention.

FIG. 16 illustrates a "page details setting" window 1600 that can be used by the bookbinding application 104.

The "page details setting" window 1600 enables users to display and set the "page setting information 411." The "page details setting" window 1600 serves as a window that allows users to perform setting of attributes that are relevant to the page. The "page details setting" window 1600 includes two sheets of page setting 1601 and editing 1602.

The check box control information having been set using the above-described setting screens can be stored in a special area. It is also desired to store the check box control information as part of the attributes in the chapter setting information 407 or the page setting information 411 illustrated in FIG. 4. In this case, an area for the check box control information may be added to FIGS. 6 and 7.

According to the print industry or the Centralized Reprographic Department (CRD), the print layout may be selected for output processing that includes printing two originals of A3 Nobi size aligned on an A4 sheet and cutting the sheet in the post-processing to obtain two pages from a piece of sheet. Other various layouts may also be selected to simply align two or more same page data or align consecutive pages.

Figure 23:
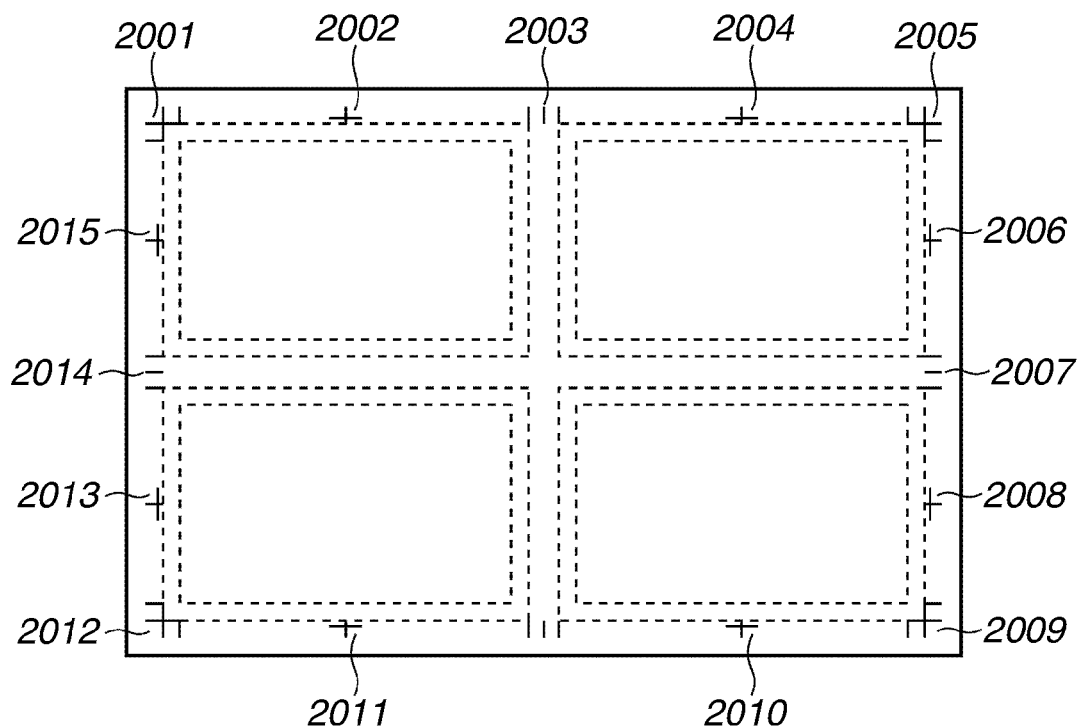
FIG. 23 illustrates an example of register marks that may be printed on a sheet.

As described above, if two or more pages are imposed on a single sheet, cutting marks, which may be referred to as "register marks", can be printed to separate each page from the sheet. FIG. 23 illustrates an example of register marks that may be printed as cutting marks on a document.

The register marks illustrated in FIG. 23 are applicable to four pages simply aligned according to the "leaf" imposition. According to the example illustrated in FIG. 23, four pages disposed on a sheet constitute two lines and two rows. Two types of register marks are present between pages, one of which is a register mark indicating a cutting position and the other is a center register mark indicating a central position of each page.

An operator can refer to the center register mark to confirm the print position on each print sheet when a print of two or more sheets aligned according to the "leaf" imposition is performed. The register marks, each indicating a cutting position, include a mark indicating a cutting position between neighboring pages and a mark indicating a cutting position located at a corner of the page, which may be referred to as a "corner register mark." The area existing between the finishing size and each register mark may be referred to as a bleed area or a bleed width.

According to a conventional system, a printer prints only the register marks on a print product. When the print product is output from the printer, an operator who actually sets the print product to a finisher may be different from an operator who has set the register marks on the print product using the bookbinding application. In this case, the operator may be unable to identify the accurate orientation of the print product relative to the finisher.

Figure 24:
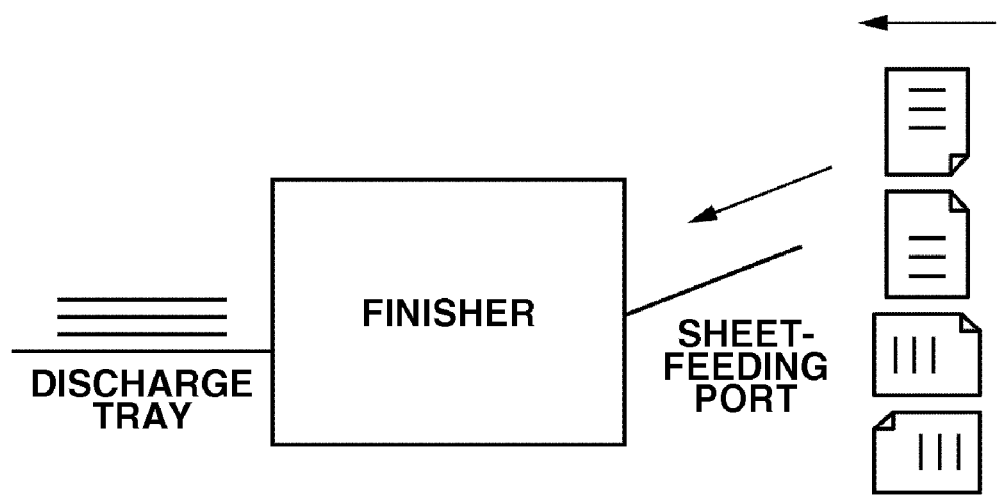
FIG. 24 illustrates an example of a configuration of a finisher according to an exemplary embodiment of the present invention.

FIG. 24 illustrates an example of a configuration of the finisher 108. A sheet-feeding port is positioned on the right side of the finisher 108, as viewed from the front side. A discharge tray is positioned on the left side of the finisher 108. When a user sets a sheet to the sheet-feeding port, each of four sides of the sheet is a candidate that may be set to the sheet-feeding port.

However, information available for an operator who sets a print product to the finisher is limited only to the register mark, the operator may be unable to accurately identify the setting direction and may erroneously set the print product along a wrong direction. To avoid such a failure, the operator is required to carefully check the setting direction every time, for example, by asking another operator who has operated the bookbinding application. Therefore, the work becomes complicated and the work efficiency may be reduced.

An exemplary embodiment of the present invention is configured to print an arrow as a mark indicating the direction of a print product to be fed to a finisher, so that an operator can accurately set the print product to the finisher.

FIG. 17 illustrates an example of a GUI that enables users to perform arrow settings according to the present exemplary embodiment.

If a user selects a sheet-feeding direction on the GUI illustrated in FIG. 17, the printer 107 prints an arrow on the selected side.

However, if there is not any bleed on the sheet-feeding side, the arrow cannot be printed on the sheet-feeding side. In this case, if a bleed is present on another side, an arrow can be printed on the bleed.

On the other hand, the sheet-feeding direction can be roughly predicted based on the original information. For example, if the binding direction is set, it can be predicted that a staple designation may be set along the same direction. If the sheet size is A3, it can be predicted that sheets may be set with their short sides aligned so as to face to the feeding direction because an ordinary finisher cannot process A3 sheets if they are set with their long sides aligned so as to face to the feeding direction.

Therefore, the present exemplary embodiment determines the set direction based on the original and the sheet information, and designates the determined direction as an initial value when the setting GUI is displayed.

Example processing according to the present exemplary embodiment is described below.

Figure 15:
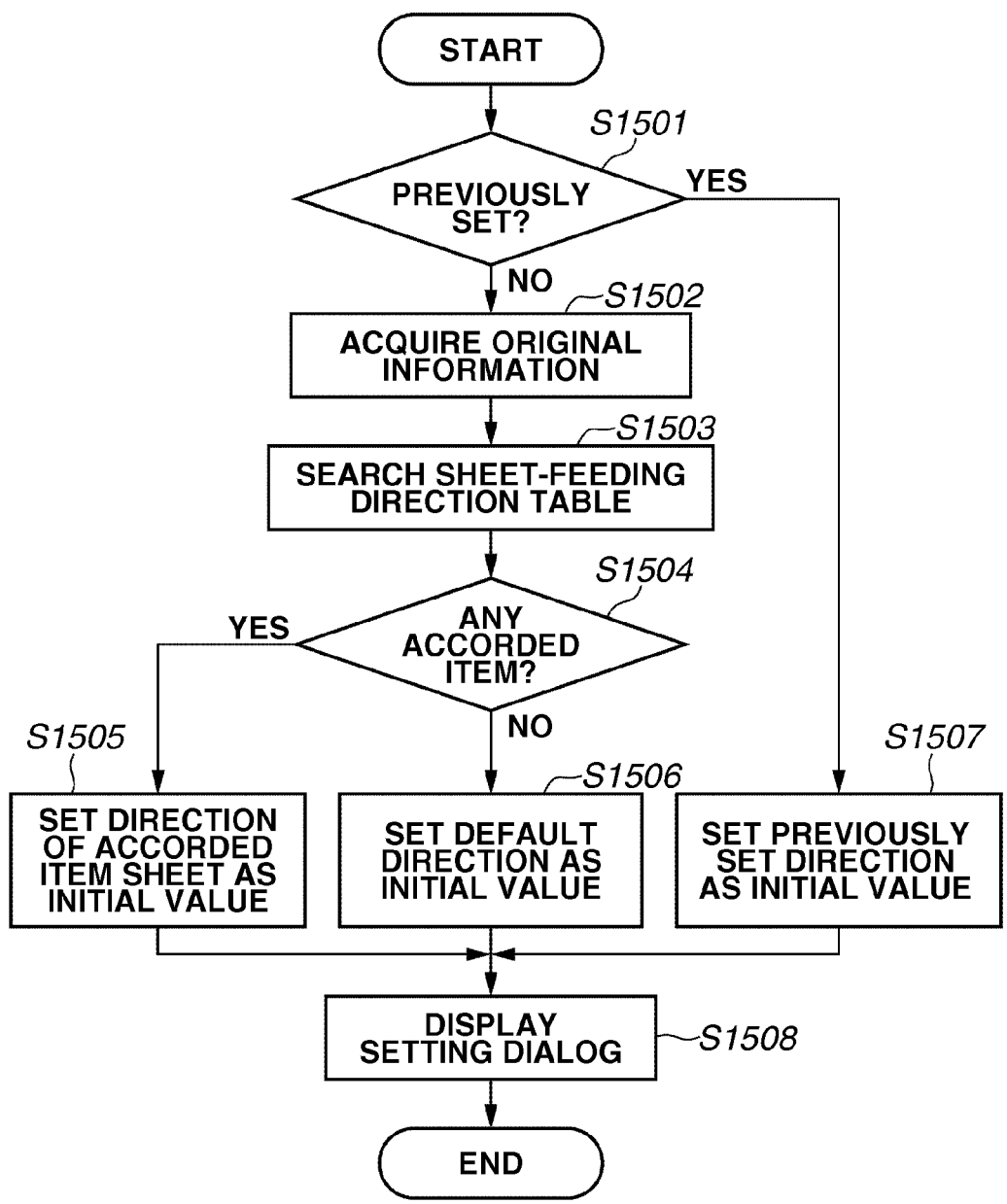
FIG. 15 is a flowchart illustrating an example of initial value determination processing, which can be executed during the display of a "sheet-feeding direction setting" window that can be used by the bookbinding application according to an exemplary embodiment of the present invention.

First, example processing for displaying the GUI that enables users to perform arrow settings is described below. FIG. 15 is a flowchart illustrating an example of processing for displaying an arrow setting GUI in the bookbinding application 104. To realize the processing of the flowchart, the CPU 201 of the host computer 100 can execute the bookbinding application 104 (i.e., a program stored in the ROM 203). The CPU 201 predicts the sheet-feeding direction based on original information when the arrow setting GUI is displayed, and presents a setting dialog that sets a prediction result as an initial value.

Figure 11:
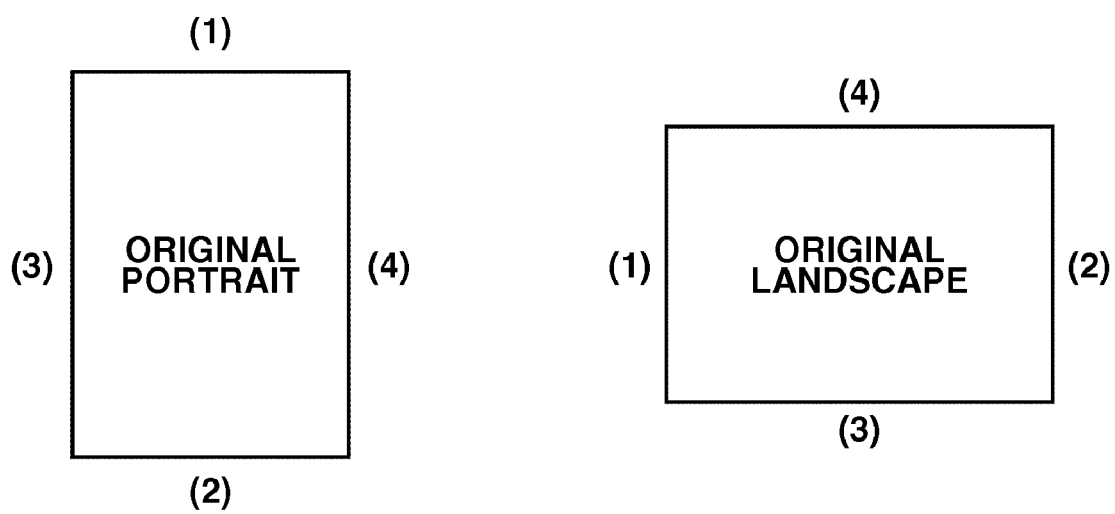
FIG. 11 illustrates a relationship between a side number of a sheet illustrated in FIG. 10 and the orientation of an original.

In step S1501, the CPU 201 determines whether the sheet-feeding direction has been previously set. If the sheet-feeding direction has been previously set (YES in step S1501), the processing proceeds to step S1507. If the sheet-feeding direction is not set (NO in step S1501), the processing proceeds to step S1502. In step S1502, the CPU 201 acquires original information. In step S1503, the CPU 201 acquires a sheet-feeding direction table. FIG. 10 illustrates an example of the sheet-feeding direction table. In the table, the number in parentheses represents one of four sides of the original as indicated in FIG. 11.

In step S1504, the CPU 201 determines whether there is any item accorded with the number in the table. For example, if the sheet size is A3, the finisher 108 may not have the capability of finishing the A3 sheet while setting its long side as a sheet-feeding side. Accordingly, the CPU 201 may predict the short side as the sheet-feeding direction. If an accorded item is present (YES in step S1504), the processing proceeds to step S1505. If there is not any accorded item (NO in step S1504), the processing proceeds to step S1506. In step S1505, the CPU 201 sets the accorded direction as an initial value. Then, the processing proceeds to step S1508. In step S1506, i.e., when no accorded item is present, the CPU 201 sets the default sheet-feeding direction as an initial value. Then, the processing proceeds to step S1508. In step S1507, the CPU 201 sets the previously set direction as an initial value. Then, the processing proceeds to step S1508. In step S1508, the CPU 201 displays a setting dialog that sets the determined initial value.

If a user presses an OK button on the setting dialog, the CPU 201 registers the sheet-feeding direction as a book attribute in the book setting information 403. The finisher 108 performs processing with reference to a predetermined point. Therefore, the CPU 201 records the origin in the book setting information 403. The origin serves as a reference point that defines the sheet-feeding direction. For example, the CPU 201 records a right side of the sheet as the origin, if the right side is set as the sheet-feeding side. The electronic original despooler 105 converts the position of the origin into a JDF when print processing is performed, and the transmission module 106 transmits the JDF to the finisher 108.

Figure 18:
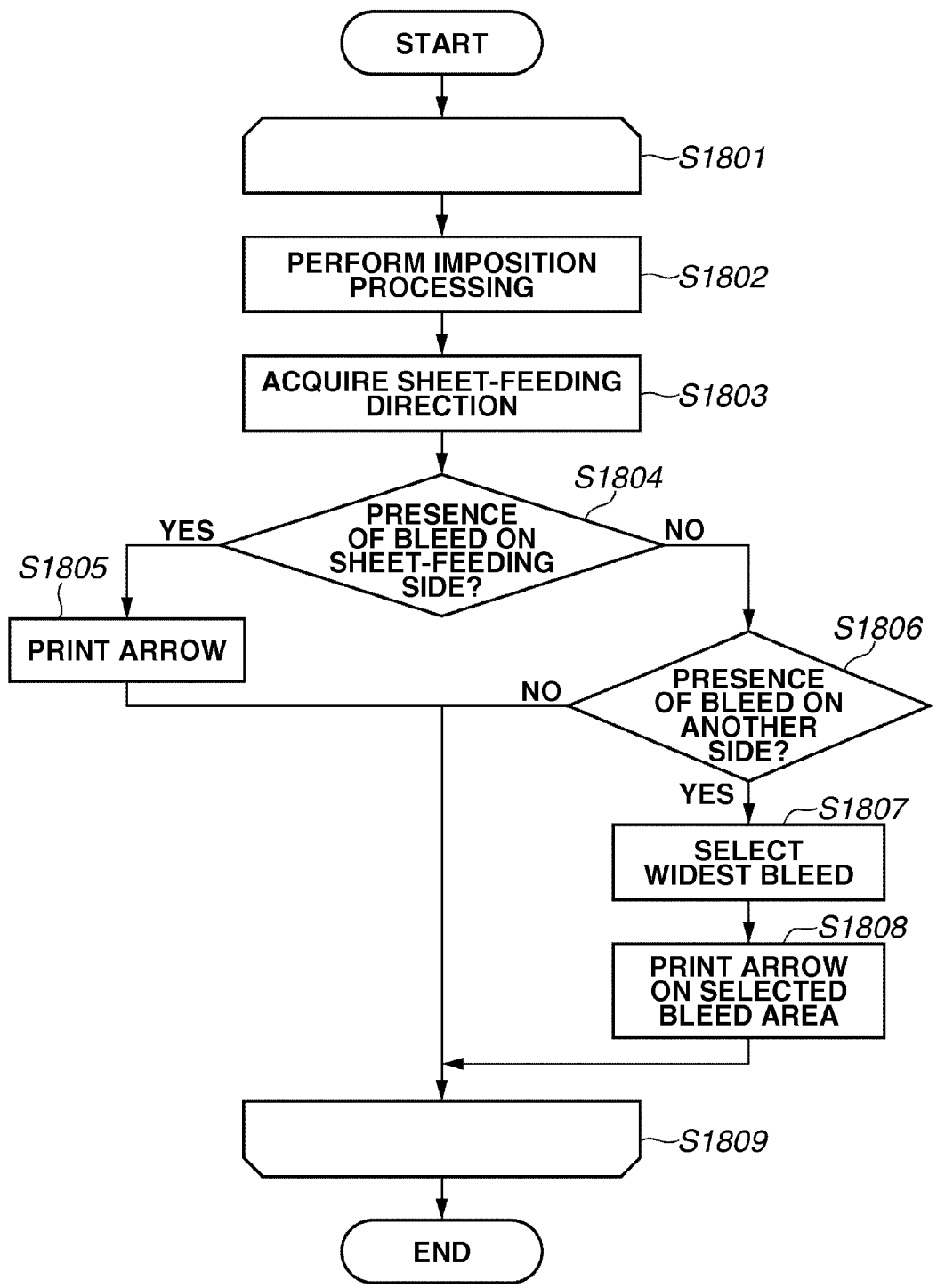
FIG. 18 is a flowchart illustrating an example of arrow print position determination processing according to an exemplary embodiment of the present invention.

Next, arrow print position determination processing according to the present exemplary embodiment is described below. FIG. 18 is a flowchart illustrating an example of arrow print position determination processing that can be executed by the bookbinding application. The CPU 201 of the host computer 100 can execute the bookbinding application 104 (i.e., a program stored in the ROM 203) to realize the processing of the flowchart illustrated in FIG. 18. The CPU 201 repetitively performs processing of steps S1801 to S1809 for every page.

First, in step S1802, the CPU 201 acquires original data and performs imposition processing for each page. If the selected imposition method is "leaf imposition", the CPU 201 acquires the number of imposition areas based on the book attributes and divides a sheet of a predetermined size according to the acquired number of imposition areas. Then, the CPU 201 secures an area of a finishing size designated by the book attributes in each divided area and continuously locates the original of the same page in each area. If the selected imposition method is "saddle stitch", the CPU 201 locates original data of two areas on one surface of a sheet. The size of the original data on each surface can be adjusted according to a finishing size, and neighboring original data can be located without providing any bleed area on the binding side.

If the selected imposition method is "4-fold", the CPU 201 locates original data of four areas on one surface of the sheet. As described above, the position and orientation of each original page may be determined so as to continuously arrange the pages in a 4-folded state according to a predetermined order. The size of the original data on each surface can be adjusted according to a finishing size and a saw-toothed trimming width can be secured if necessary.

Through the above-described processing, the CPU 201 can complete allocation of print object pages on respective sheets. It is desired that the CPU 201 provisionally determines the location position of each original page in step S1802 and determines the position of each arrow. In this case, the despooler 105 can generate drawing data of original pages required for respective physical pages as well as drawing data of each arrow.

In step S1803, the CPU 201 acquires the sheet-feeding direction from the book setting information 403. Then, the processing proceeds to step S1804. In step S1804, the CPU 201 determines whether there is any bleed on the sheet-feeding side. If a bleed is present on the sheet-feeding side (YES in step S1804), the processing proceeds to step S1805. If there is not any bleed on the sheet-feeding side (NO in step S1804), the processing proceeds to step S1806. In step S1805, the CPU 201 instructs the printer 107 to print an arrow on the sheet-feeding side. Then, the processing proceeds to step S1809.

Figure 22:
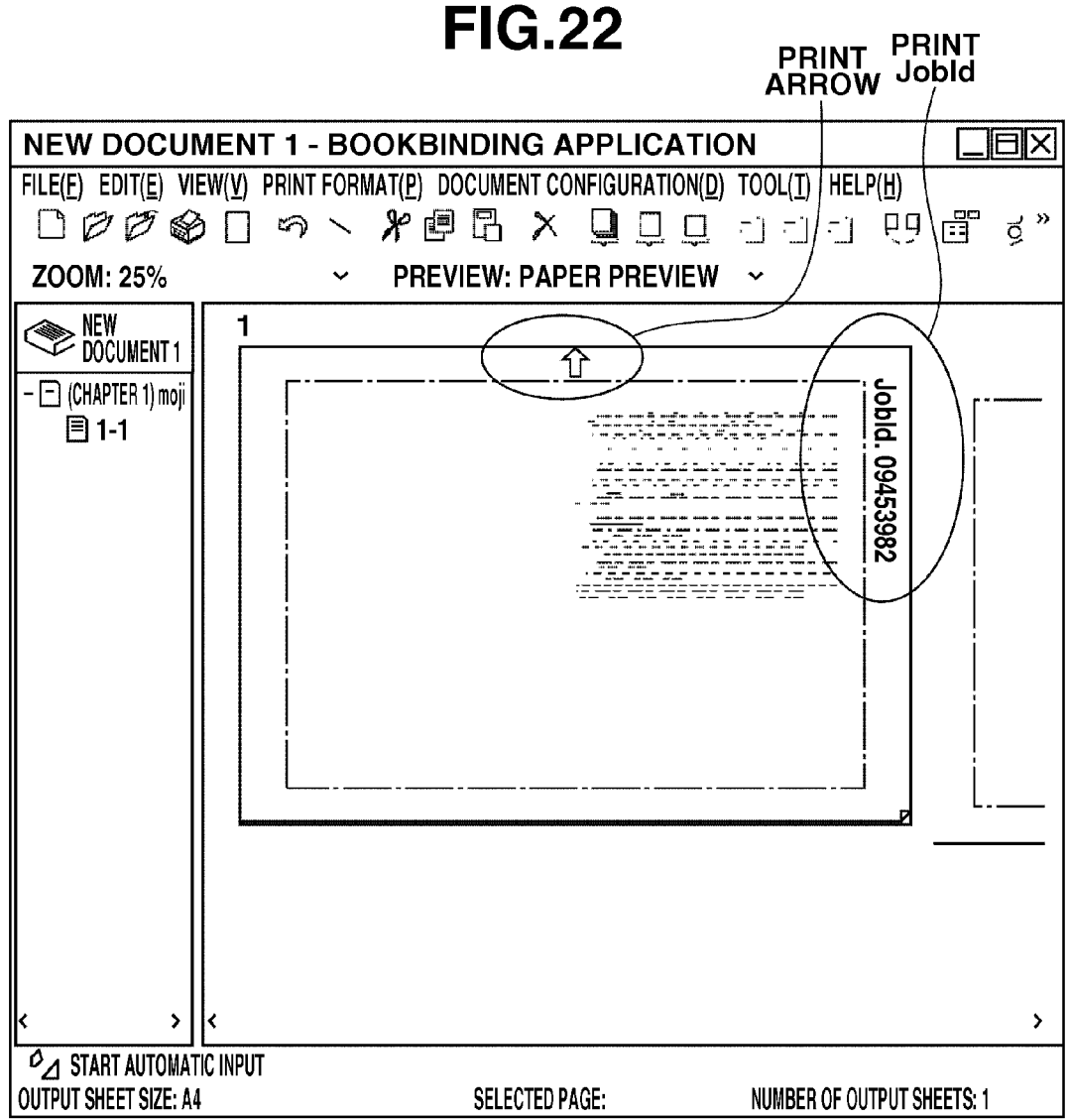
FIG. 22 illustrates an example of a GUI that displays a preview of a printed mark indicating the sheet-feeding direction on a sheet according to an exemplary embodiment of the present invention.

FIG. 22 illustrates a preview image that includes an arrow printed on the sheet-feeding side. In step S1806, the CPU 201 determines whether there is any bleed on a side other than the sheet-feeding side. If there is not any bleed on sides other than the sheet-feeding side (NO in step S1806), the processing proceeds to step S1809. If a bleed is present on a side other than the sheet-feeding side (YES in step S1806), the processing proceeds to step S1807. In step S1807, the CPU 201 selects a side having the widest bleed. Then, the processing proceeds to step S1808. In step S1808, the CPU 201 instructs the printer 107 to print an arrow on the selected side. Then, the processing proceeds to step S1809.

As described above, the present exemplary embodiment can eliminate errors in the process of feeding sheets to a finisher by printing an arrow on the sheet. The present exemplary embodiment can further reduce the burden placed on users by predicting the sheet-feeding direction.

The finisher 108 may be configured to recognize a job ID printed at a predetermined position and perform finishing processing based on the recognized job ID. In this case, the finisher 108 can include, at its sheet-feeding port, an apparatus capable of reading and recognizing a job ID printed on each sheet to perform post-processing. Therefore, the print of an arrow can be replaced with the print of a job ID. The position where a job ID can be printed is dependent on each finisher because the area where the finisher can recognize the job ID is limited. Therefore, the printer 107 prints a job ID at a specific position in relation with the position of the sheet-feeding port. If a user designates printing a job ID via the UI, the printer 107 prints the designated job ID. The user can input information for the job ID via a setting screen (not illustrated) of the bookbinding application 104.

Figure 19:
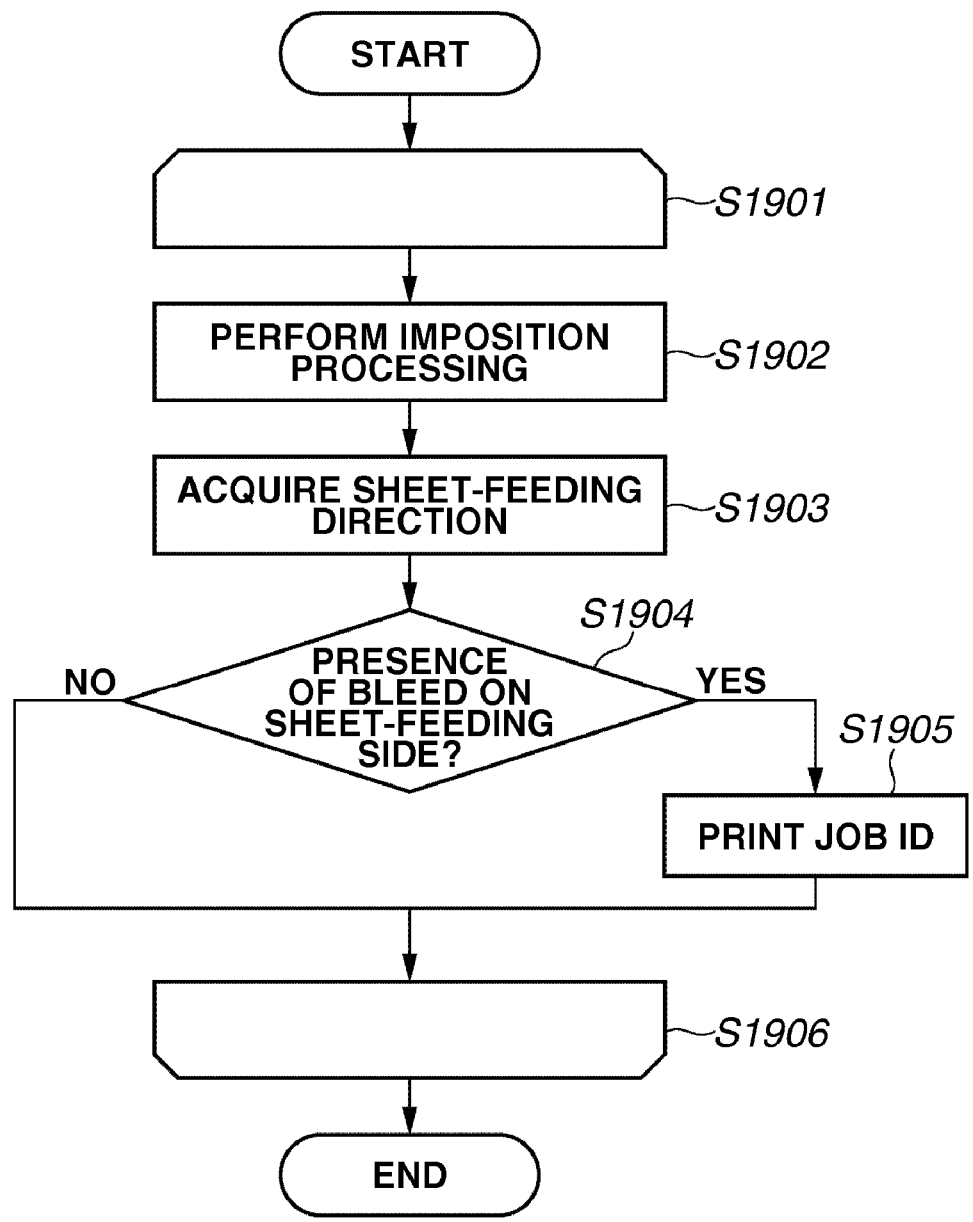
FIG. 19 is a flowchart illustrating an example of job ID print position determination processing according to an exemplary embodiment of the present invention.

Job ID print position determination processing according to the present exemplary embodiment is described below. FIG. 19 is a flowchart illustrating an example of the job ID print position determination processing that can be executed by the bookbinding application 104. The CPU 201 of the host computer 100 can execute the bookbinding application 104 (i.e., a program stored in the ROM 203) to realize the processing of the flowchart illustrated in FIG. 19. In the present exemplary embodiment, it is assumed that the finisher 108 recognizes a job ID printed on the right side of a sheet that may be fed. The finisher 108 may recognize a job ID printed on another side. Therefore, the area where the job ID is printed is not limited to the sheet-feeding side. To print a job ID on a side other than the sheet-feeding side, the print position of the job ID can be changed.

The CPU 201 repetitively performs processing of steps S1901 to S1906 for every page. In step S1902, the CPU 201 acquires original data and performs imposition processing on the acquired data. In step S1903, the CPU 201 acquires the sheet-feeding direction from the book setting information 403. Then, the processing proceeds to step S1904. In step S1904, the CPU 201 determines whether there is any bleed on the right side (i.e., a job ID print side) of the sheet that may be fed. If there is not any bleed (NO in step S1904), the processing proceeds to step S1906. If a bleed is present (YES in step S1904), the processing proceeds to step S1905.

In step S1905, the CPU 201 instructs the printer 107 to print a job ID in the bleed area on the right side of the sheet that may be fed. Then, the processing proceeds to step S1906. FIG. 22 illustrates the preview image that includes a job ID printed on the right side of the sheet. In the present exemplary embodiment, the job ID that may be printed is a numerical value. However, to enable the finisher 108 to easily read the job ID, the CPU 201 can print a bar code representing the job ID.

Through the above-described processing, the present exemplary embodiment can fix the job ID position relative to the finisher 108. Users can set print products referring to the job ID printed thereon so that the finisher 108 can read the job ID. Therefore, the present exemplary embodiment can prevent the print products from being fed in the wrong direction.

The finisher 108 may be associated with a console whose GUI can display a preview image of a print product. FIG. 25 illustrates an example configuration of a system that includes a finisher and a console connected to the finisher. The console has a GUI display function. The console screen displays a plan view of the finisher. An image that may be displayed by the console is a preview that instructs the setting direction of a print product that may be fed to the finisher. According to the example illustrated in FIG. 25, the preview screen instructs a user to set a short side of the print product so as to face the sheet-feeding port The finisher receives job contents from the console and performs post-processing. Instead of printing an arrow or a job ID, it may also be possible to generate a preview image and transmit the generated preview image to the finisher together with finishing information. An operator can confirm the setting direction while viewing the preview image displayed on the console. In this case, the sheet-feeding port of the finisher may be positioned on the front side or another side. Therefore, if a preview image of the original data is directly transmitted, the console may instruct a wrong direction. To eliminate this drawback, it is useful to appropriately rotate the image to adjust the orientation of the sheet so as to accord with the viewing direction of an operator who faces the front side of the finisher.

FIG. 17 illustrates an example of the GUI that enables users to perform arrow setting according to the present exemplary embodiment.

In the GUI, an item "transmit leading page image to finisher" is selected, an image is generated.

Figure 20:
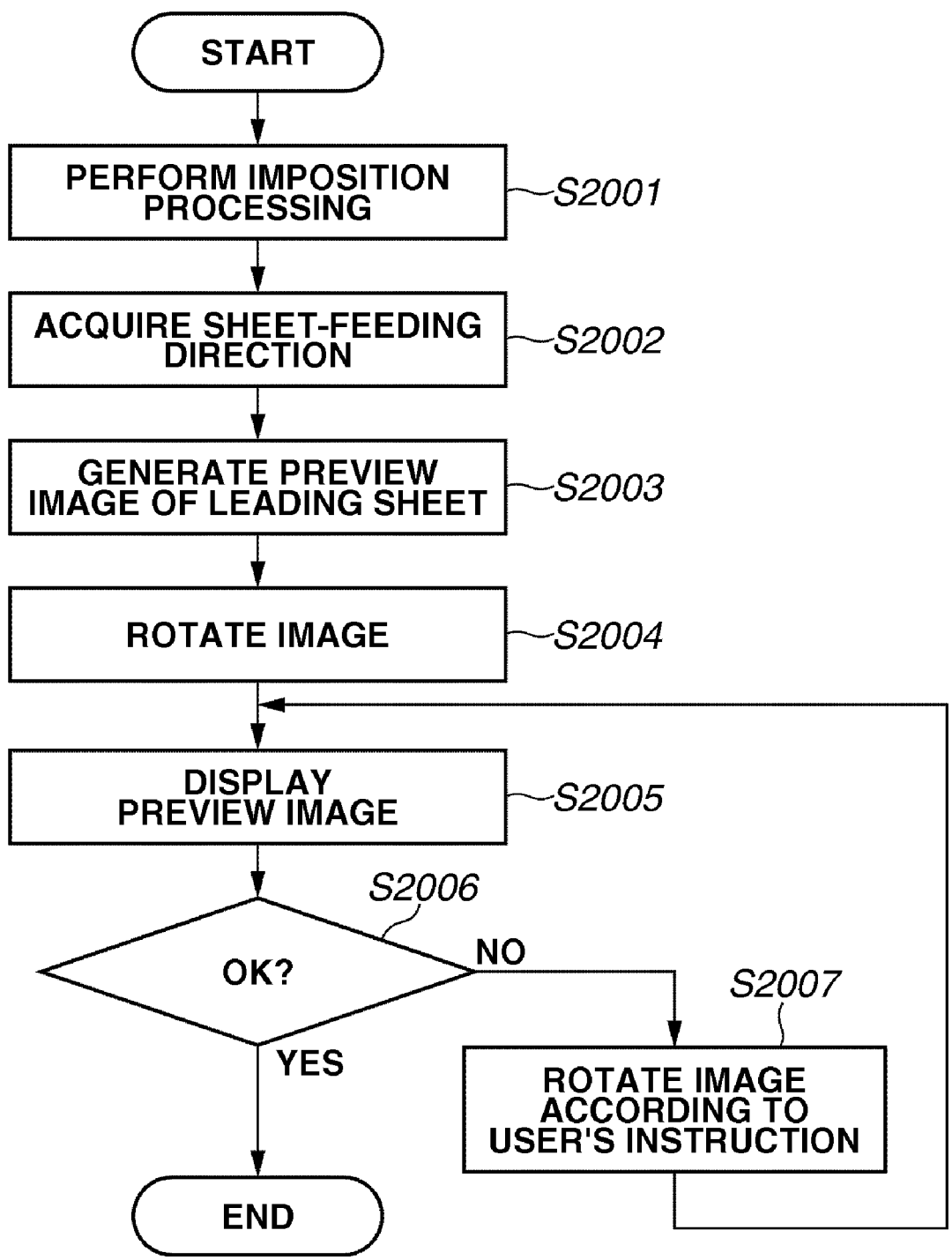
FIG. 20 is a flowchart illustrating an example of preview image generation processing for generating a preview image that may be transmitted to a finisher according to an exemplary embodiment of the present invention.

Example processing according to the present exemplary embodiment is described. FIG. 20 is a flowchart illustrating an example of image data generation processing, which can be executed by the bookbinding application 104. The CPU 201 of the host computer 100 can execute the bookbinding application 104 (i.e., a program stored in the ROM 203) to realize the processing of the flowchart illustrated in FIG. 20. If an OK button is pressed on the GUI, the CPU 201 starts the processing. In step S2001, the CPU 201 acquires original data and performs imposition processing. In step S2002, the CPU 201 acquires the sheet-feeding direction from the book setting information 403. Then, the processing proceeds to step S2003.

Figure 21:
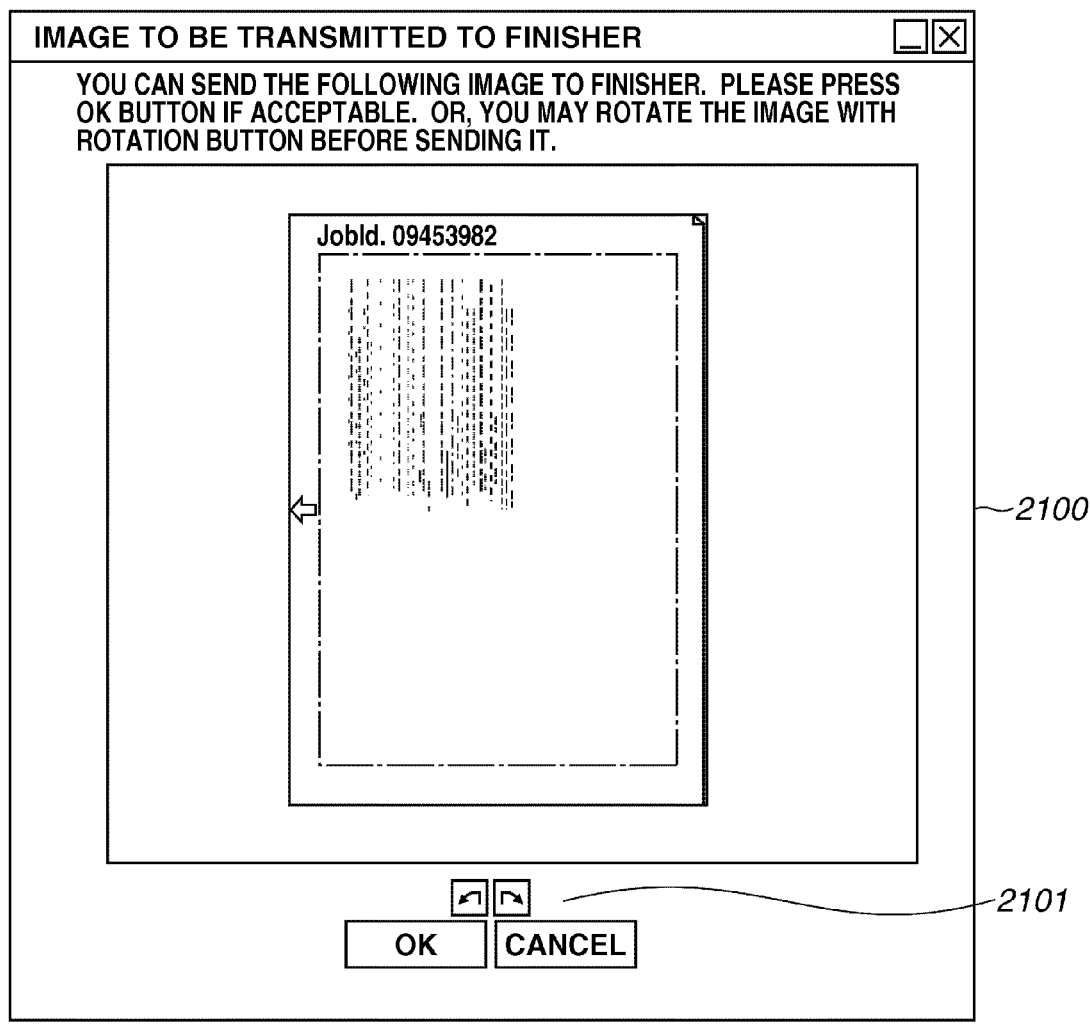
FIG. 21 illustrates an example of a graphical user interface (GUI) that can be used to present a preview image, which may be transmitted to the finisher, to users according to an exemplary embodiment of the present invention.

In step S2003, the CPU 201 generates a preview image of the leading sheet. Then, the processing proceeds to step S2004. In step S2004, the CPU 201 rotates the image generated in step S2003 so as to accord with the default orientation. The default orientation can be set beforehand. For example, the CPU 201 can rotate the image so as to adjust the sheet-feeding side to the right side of the image. In step S2005, the CPU 201 displays a rotated image on the GUI as illustrated in FIG. 21. If a user presses an OK button (YES in step S2006), the CPU 201 terminates the processing of this routine. If the OK button is not pressed (NO in step S2006), the processing proceeds to step S2007. In step S2007, the CPU 201 rotates the image according to a user's instruction if a rotation button 2101 is operated. Then, the processing returns to step S2005.

If the transmission module 106 receives the generated image data and a job ticket, the transmission module 106 can transmit a JDF including the received data to the finisher 108.

Accordingly, users can confirm the sheet-feeding direction of each print product while viewing an GUI image of the finisher.

In another exemplary embodiment, the above-described various operations (e.g., printing of an arrow, printing of a job ID, and transmission of a preview image to the finisher) can be simultaneously performed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-138250 filed May 27, 2008, which is hereby incorporated by reference herein in its entirety.

What is claimed is:

1. A document processing system including a printing apparatus configured to perform printing and a post-processing apparatus configured to execute post-processing on a print product, the document processing system comprising:
    an acquiring unit configured to acquire information on a paper size and a binding direction of the print product;
    a setting unit configured to set a sheet-feeding direction of the print product to be fed to the post-processing apparatus based on the information acquired by the acquiring unit;
    a determining unit configured to determine a mark position of a mark to be printed indicating the sheet-feeding direction set by the setting unit, based on the sheet-feeding direction set by the setting unit and a bleed area of the print product; and
    a print control unit configured to control the printing apparatus to print on the print product the mark indicating the sheet-feeding direction set by the setting unit at the mark position by the determining unit.

2. The document processing system according to claim 1, wherein the print control unit is configured to control the printing apparatus to print the mark in the bleed area existing along a side of the print product extending in the sheet-feeding direction.

3. The document processing system according to claim 1, further comprising a determination unit configured to determine whether the bleed area is present along a side of the print product extending in the sheet-feeding direction set by the setting unit,
    wherein, if the determination unit determines that there is not any bleed area, the print control unit is configured to control the printing apparatus to print the mark indicating the sheet-feeding direction in the bleed area existing along another side of the print product.

4. The document processing system according to claim 1, wherein the print control unit is configured to control the printing apparatus to print the mark along a side of the print product where a largest bleed area is present.

5. The document processing system according to claim 1, wherein the setting unit includes a prediction unit configured to predict the sheet-feeding direction based on original information and a presenting unit configured to present a prediction result obtained by the prediction unit.

6. The document processing system according to claim 1, wherein the print control unit is configured to control the printing apparatus to print a job ID as the mark in an area of the print product that can be recognized by the post-processing apparatus.

7. A method for controlling a document processing system including a printing apparatus configured to perform printing and a post-processing apparatus configured to execute post-processing on a print product, the method comprising:
acquiring information on a paper size and a binding direction of the print product;
setting a sheet-feeding direction of the print product to be fed to the post-processing apparatus based on the information acquired;
determining a mark position of a mark to be printed indicating the sheet-feeding direction set, based on the sheet-feeding direction set and a bleed area of the print product; and
controlling the printing apparatus to print on the print product the mark indicating the set sheet-feeding direction at the determined mark position.

8. The method according to claim 7, further comprising controlling the printing apparatus to print the mark in the bleed area existing along a side of the print product extending in the sheet-feeding direction.

9. The method according to claim 7, further comprising:
determining whether the bleed area is present along a side of the print product extending in the sheet-feeding direction, and
if it is determined that there is not any bleed area, controlling the printing apparatus to print the mark indicating the sheet-feeding direction in the bleed area existing along another side of the print product.

10. The method according to claim 7, further comprising controlling the printing apparatus to print the mark along a side of the print product where a largest bleed area is present.

11. The method according to claim 7, further comprising:
predicting the sheet-feeding direction based on original information; and
presenting the predicted sheet-feeding direction.

12. The method according to claim 7, further comprising controlling the printing apparatus to print a job ID as the mark in an area of the print product that can be recognized by the post-processing apparatus.

13. A non-transitory computer-readable storage medium storing a computer program that, when installed on a computer, causes the computer to execute a method for controlling a document processing system including a printing apparatus configured to perform printing and a post-processing apparatus configured to execute post-processing on a print product, the method comprising:
acquiring information on a paper size and a binding direction of the print product;
setting a sheet-feeding direction of the print product to be fed to the post-processing apparatus based on the acquired information;
determining a mark position of a mark to be printed indicating the sheet-feeding direction set, based on the sheet-feeding direction set and a bleed area of the print product; and
controlling the printing apparatus to print on the print product the mark indicating the set sheet-feeding direction at the determined mark position.

* * * * *